Aug. 26, 1952        F. E. BEST        2,608,094

GROUND FOLLOWING MAP AND NAVIGATION INSTRUMENT

Original Filed Aug. 15, 1941        14 Sheets-Sheet 1

Frank Ellison Best

INVENTOR.

Aug. 26, 1952 F. E. BEST 2,608,094
GROUND FOLLOWING MAP AND NAVIGATION INSTRUMENT
Original Filed Aug. 15, 1941 14 Sheets-Sheet 2

Frank Ellison Best

INVENTOR.

Aug. 26, 1952 F. E. BEST 2,608,094
GROUND FOLLOWING MAP AND NAVIGATION INSTRUMENT
Original Filed Aug. 15, 1941 14 Sheets-Sheet 3

Aug. 26, 1952      F. E. BEST      2,608,094
GROUND FOLLOWING MAP AND NAVIGATION INSTRUMENT
Original Filed Aug. 15, 1941      14 Sheets-Sheet 4

Frank Ellison Best
INVENTOR.

Aug. 26, 1952     F. E. BEST     2,608,094
GROUND FOLLOWING MAP AND NAVIGATION INSTRUMENT

Original Filed Aug. 15, 1941     14 Sheets-Sheet 7

INVENTOR.

Aug. 26, 1952     F. E. BEST     2,608,094
GROUND FOLLOWING MAP AND NAVIGATION INSTRUMENT
Original Filed Aug. 15, 1941     14 Sheets-Sheet 8

Frank Ellison Best
INVENTOR.

Aug. 26, 1952      F. E. BEST      2,608,094
GROUND FOLLOWING MAP AND NAVIGATION INSTRUMENT
Original Filed Aug. 15, 1941      14 Sheets—Sheet 9
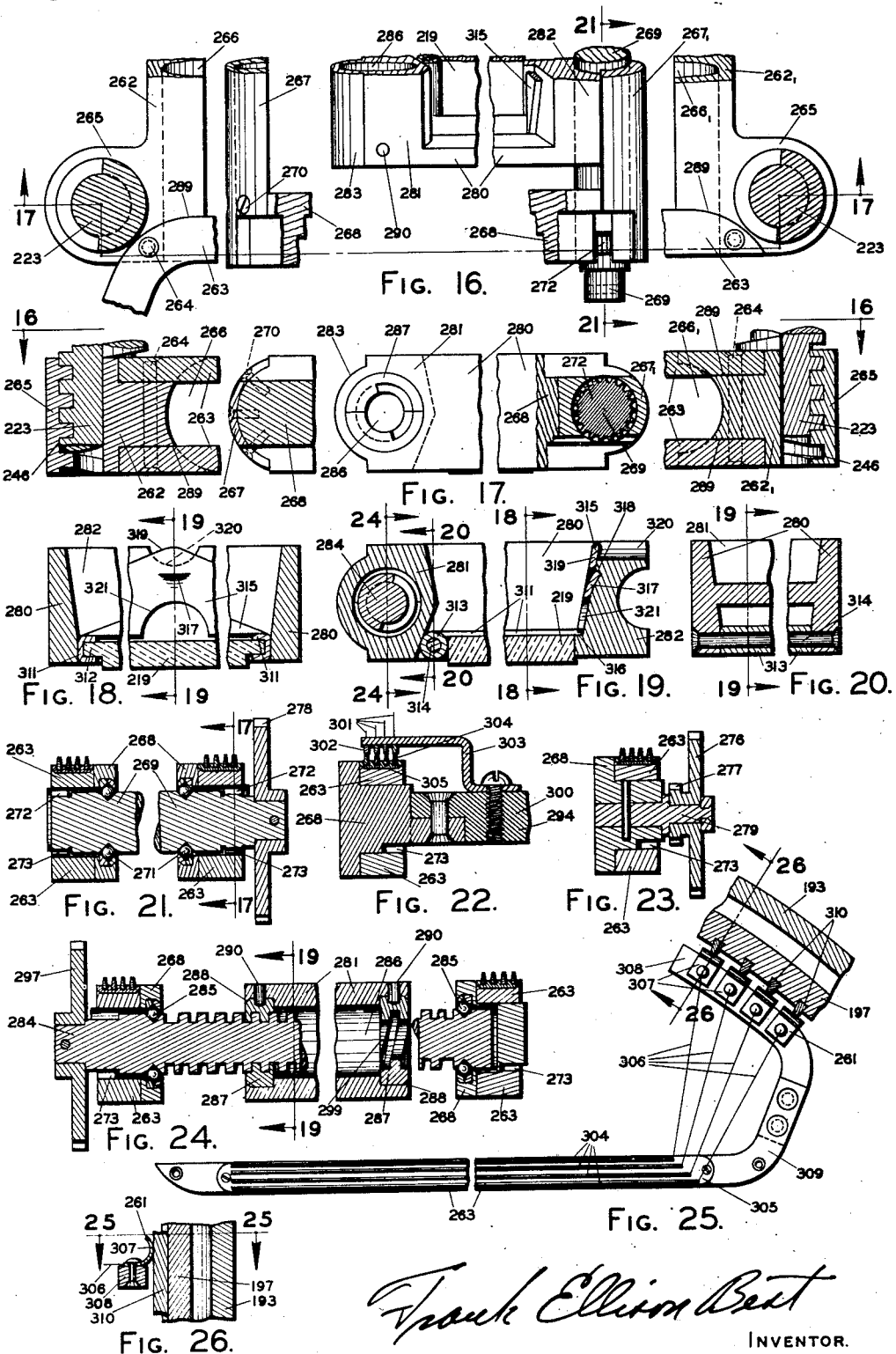
Frank Ellison Best
INVENTOR.

Aug. 26, 1952     F. E. BEST     2,608,094
GROUND FOLLOWING MAP AND NAVIGATION INSTRUMENT
Original Filed Aug. 15, 1941     14 Sheets-Sheet 10
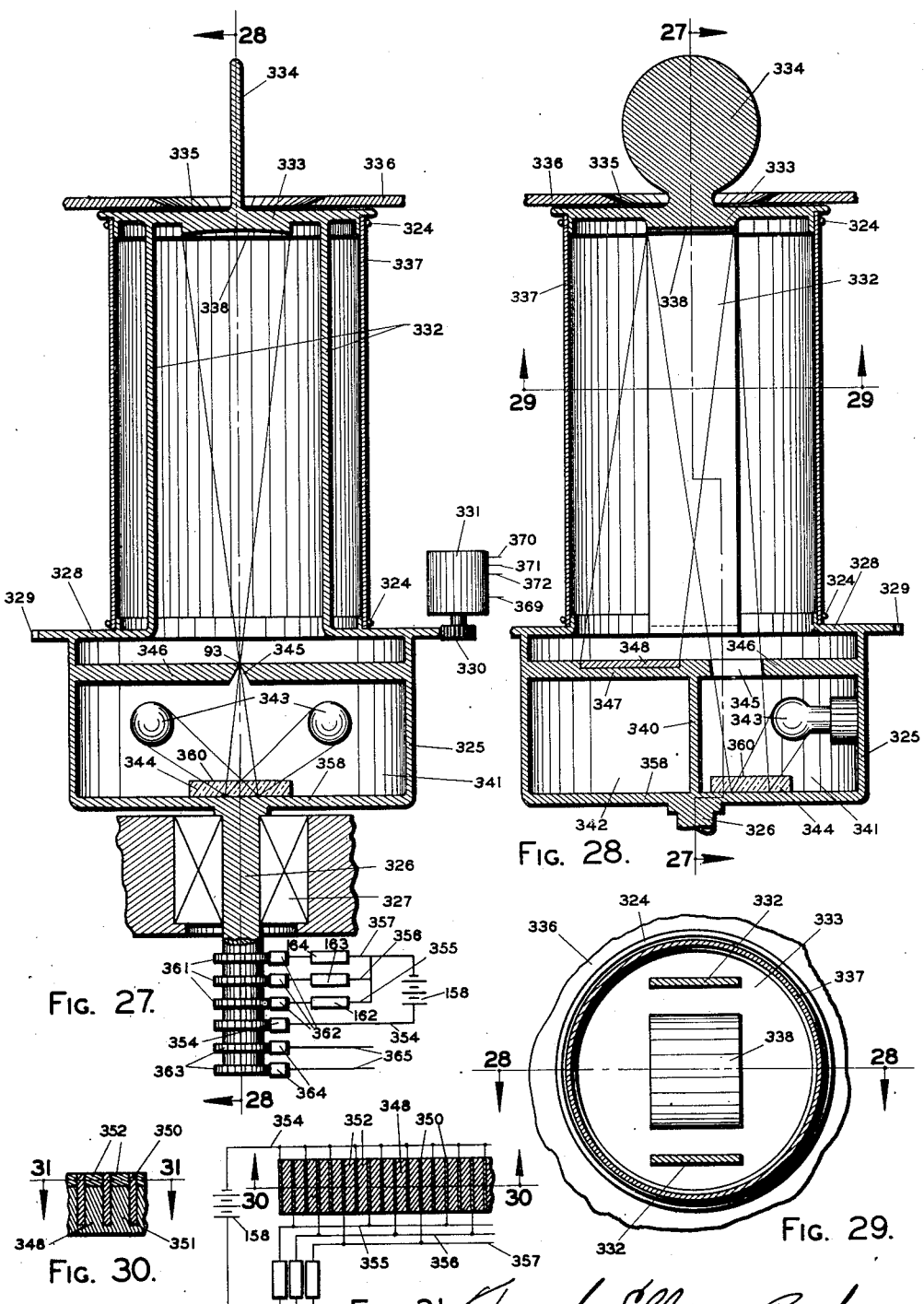
INVENTOR.

Aug. 26, 1952  F. E. BEST  2,608,094
GROUND FOLLOWING MAP AND NAVIGATION INSTRUMENT
Original Filed Aug. 15, 1941  14 Sheets-Sheet 11

Frank Ellison Best
INVENTOR.

Aug. 26, 1952     F. E. BEST     2,608,094
GROUND FOLLOWING MAP AND NAVIGATION INSTRUMENT
Original Filed Aug. 15, 1941     14 Sheets-Sheet 12

Frank Ellison Best

INVENTOR.

Aug. 26, 1952     F. E. BEST     2,608,094
GROUND FOLLOWING MAP AND NAVIGATION INSTRUMENT
Original Filed Aug. 15, 1941     14 Sheets-Sheet 13
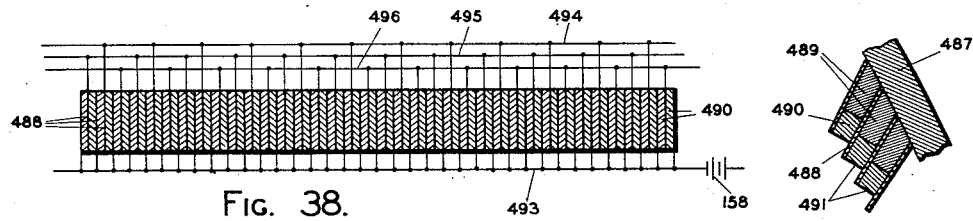
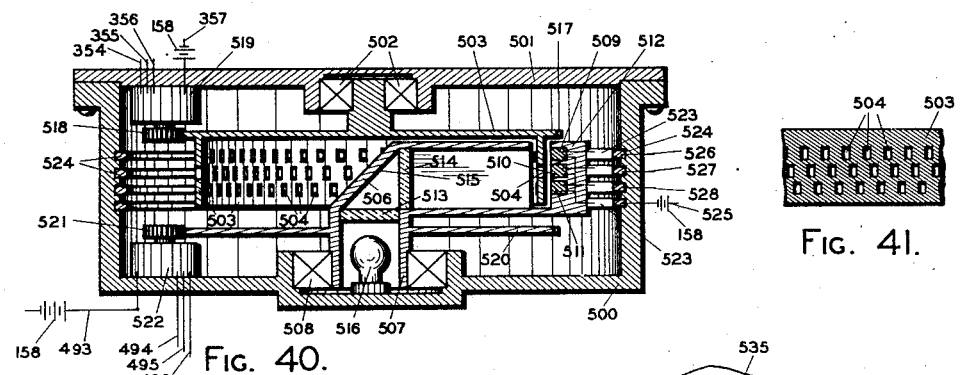
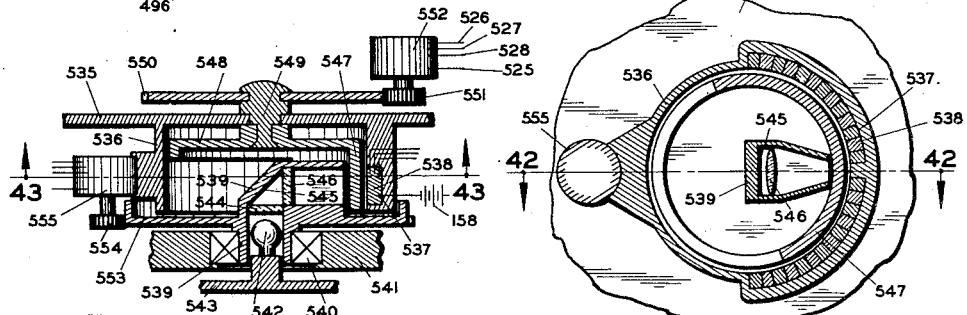
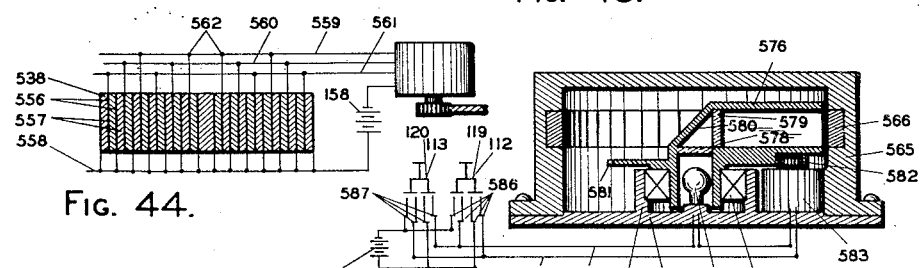
Frank Ellison Best
INVENTOR.

Patented Aug. 26, 1952

2,608,094

UNITED STATES PATENT OFFICE 2,608,094

GROUND FOLLOWING MAP AND NAVIGATION INSTRUMENT

Frank Ellison Best, Indianapolis, Ind..

Original application August 15, 1941, Serial No. 407,087. Divided and this application November 4, 1946, Serial No. 707,739

9 Claims. (Cl. 73—178)

Nature and objects of invention

This is a divisional application of my co-pending application on Ground Following Map and Navigation Instrument, filed August 15, 1941, Serial No. 407,087 now abandoned.

My invention relates to ground following map means adapted for use in controlling the navigation of vehicles of all types such as aircraft, space ships, boats, cars, tanks and the like.

The principal object of this invention is to provide automatic means, in one compact unit, for receiving, composing and advantageously displaying certain important navigation information and data desired by the navigator or operator of a moving vehicle, or by ground operators assisting in the navigation of the vehicle.

Another object is to provide a composite, variably-scaled image of the surface configurations of the ground round about and beneath a craft, of a distance scale image giving the correct scale in miles or kilometers from the location of the craft on said image, and of a direction-indicating image showing the line of travel and deviation from the heading due to drift of said craft relative to said surface configurations image. This is accomplished by fully automatic devices having manual adjusting means, and convenient indicating means, adapted to indicate values composed by the said automatic means and used in producing the aforesaid composite image.

A compass card, and a true north ring with appropriate markings and used in making declination corrections, preferably contribute to the desired result, and cardinal congruence between image and surface configurations is preferably maintained by automatic repeater motor means following a master compass.

In the device that I have selected to illustrate my invention, I have purposely chosen simple, rudimentary means that are easy to draw and illustrate and I have stayed away from the more highly technical and involved means that I prefer to generally employ in practice. For instance, I am purposely selecting a map plate that can be made by the photographic process and an ordinary light projector rather than the more elaborate radar or television means that I will often preferably employ. I also use a simple, though antiquated, light responsive means, but one that lends itself to simple illustration and description.

Other objects will be apparent from a study of the following description and the concluding claims.

Drawings

In the drawings,

Fig. 16 is a fragmentary sectional view of parts of the map frames, taken substantially on broken lines 16—16 of Figs. 2 and 17, parts being shown in relief, certain parts being in relatively exploded relation.

Fig. 17 is a fragmentary sectional view of parts of the map frames, taken substantially on broken lines 17—17 of Figs. 3 and 16, parts being shown in relief, certain parts being in relatively exploded relation.

Fig. 18 is a fragmentary sectional view, with parts in elevation, taken substantially on broken line 18—18 of Fig. 19, showing parts of the map frame.

Fig. 19 is a fragmentary sectional view, with parts in elevation, taken substantially on broken lines 19—19 of Figs. 18 and 20.

Fig. 20 is a fragmentary sectional view with parts in elevation, taken substantially on broken lines 20—20 of Fig. 19.

Fig. 21 is a fragmentary sectional view, taken substantially on broken line 21—21 of Figs. 3 and 16, showing means for moving a north and south map frame.

Fig. 22 is a fragmentary sectional view, taken substantially on broken line 22—22 of Fig. 3, showing a bracket for supporting a motor that moves the north and south map frame and showing parts of the electrical conductor means for said motor.

Fig. 23 is a fragmentary sectional view, taken substantially on broken line 23—23 of Fig. 3.

Fig. 24 is a fragmentary sectional view, taken substantially on broken line 24—24 of Fig. 3, showing means for moving an east and west map frame.

Fig. 25 is a fragmentary plan view of a frame member and electrical conductor means connected therewith, taken on line 25—25, Fig. 26.

Fig. 26 is a fragmentary sectional view taken substantially on broken line 26—26 of Fig. 25.

Fig. 27 is a vertical sectional view on broken line 27—27 of Fig. 28 showing an air speed device constructed in accordance with this invention.

Fig. 28 is a vertical sectional view of the same taken substantially on broken line 28—28 of Fig. 27.

Fig. 29 is a horizontal section taken substantially on broken line 29—29 of Fig. 28.

Fig. 30 is a fragmentary cross-sectional view of a light responsive cell used in this air speed device, said section being taken on line 30—30 of Fig. 31.

Fig. 31 is a fragmentary diagrammatic sectional view of said light responsive cell said section being taken on line 31—31 of Fig. 30.

Fig. 38 is a diagrammatic view of a logarithmic light actuated grid or cell embodied in the wind velocity device shown in Figs. 36 and 37.

Fig. 39 is a fragmentary sectional detail, on a larger scale than Figs. 36 and 37, of the logarithmic light responsive cell embodied in Figs. 36, 37 and 38.

Fig. 40 is an axial sectional view of a device for finding the algebraic sum of two variable values, parts being shown diagrammatically.

Fig. 41 is a fragmentary view of a light shutter used in the device shown in Fig. 40.

Fig. 42 is an axial sectional view of a device for converting values represented in terms of arithmetical scale to values represented in terms of motion, parts being diagrammatically shown.

Fig. 43 is a sectional view taken substantially on broken line 43—43 of Fig. 42.

Fig. 44 is a diagrammatic view of a fragment of a light grid cell embodied in Figs. 42 and 43.

Fig. 45 is an axial sectional view of a manual map mover embodied in this invention, certain electrical controls being diagrammatically shown.

Fig. 46 is a diagrammatic view of a fragment of a light grid cell used in the device shown in Fig. 45.

Like reference numerals designate like parts throughout the several views.

General description

Figure 4:
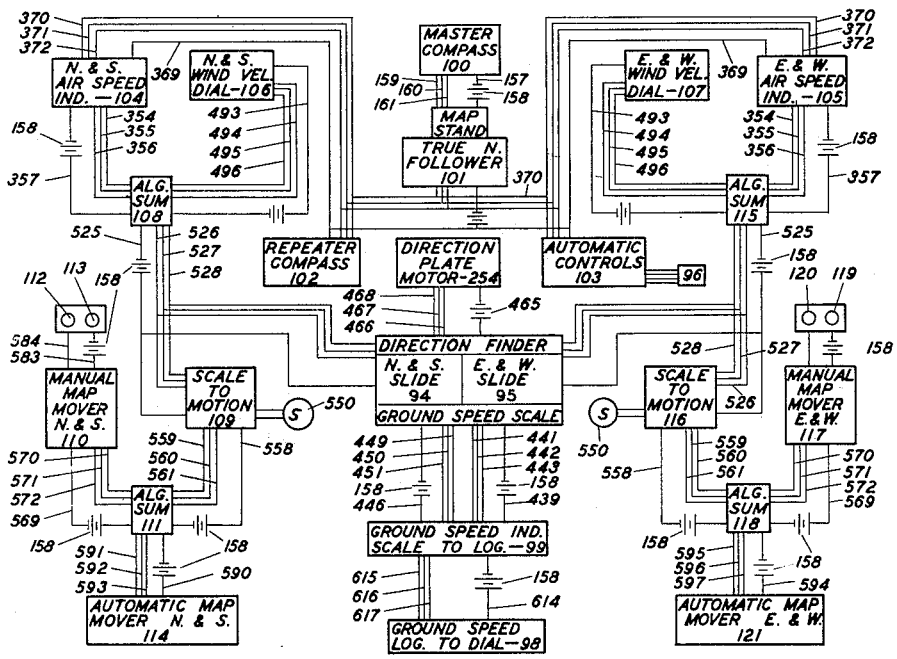
Fig. 4 is a diagrammatic view showing the relation of the various units of the device to each other and showing in a general way the electrical connections.

Before describing the various units embodied in this ground following map and navigation instrument I will describe in a general way the set up as shown diagrammatically in Fig. 4. I will then describe the several units and explain their cooperation in the combination diagrammatically shown in Fig. 4.

In a general way the apparatus shown diagrammatically in Fig. 4 comprises a master magnetic compass 100 controlled by the earth's magnetic field. This master compass 100 is electrically connected with and controls true north follower devices 101 having manually adjustable means provided in connection therewith for making suitable corrections for magnetic declination or variation so that a dial compass card or other means controlled by the true north follower 101 will follow the true north rather than the magnetic north and will always indicate or follow the true directions. The true north follower 101 thus cooperates with the master compass 100 to provide visual means for always indicating true direction irrespective of turning of the vehicle on which the apparatus is carried, and provides control means for instruments where directional control is required.

The true north follower 101 is used to operate repeater motors at any desired location on the vehicle. These repeater motors operate in exact synchronism with the true north follower as hereinafter explained, and they may be used to operate any desired mechanism. In Fig. 4 I have shown the true north follower as electrically connected with a repeater compass 102 and with automatic control means 103 for the vehicle. The repeater compass 102 preferably will give the same true directional readings as the dial means that is operated directly by the true north follower. The automatic control means may be any desired form of directional control such for instance as steering or other means 96 for holding an airplane or ship on a predetermined course.

The true north follower mechanism 101 is also electrically connected with a north and south air speed device 104 and an east and west air speed device 105. These air speed devices 104 and 105 are for use particularly on air craft and are preferably positioned on parts of the craft where they are exposed to the true north and south components and east and west components respectively of air velocity. The true north follower serves to control, through follower means, the directional positioning of small vanes on these air speed devices. Preferably the vane on the north and south air speed device 105 is positioned and maintained by the true north follower in an east and west plane and the vane on the east and west follower is positioned and maintained in a north and south plane as more fully hereinafter explained in connection with these devices.

Two manually operated wind velocity dials or indicators 106 and 107 are provided for use in connection with the two air speed devices 104 and 105 respectively. The wind velocity device 106 is a north and south device adapted to be set manually to indicate the north or south component of wind velocity as ascertained ordinarily from a ground station. The wind velocity device 107 is an east and west device adapted to be set manually to indicate the east and west component of wind velocity, as ascertained ordinarily from a ground station. The information, as usually obtained from the ground, is used as a basis to work from but it may be inaccurate and is corrected for error after the device is in operation as hereinafter explained.

The north and south air speed device 104 and the north and south wind velocity device 106 are electrically connected, by repeater mechanism hereinafter described, with a light controlled electrically actuated algebraic totalizer 108 which is preferably operative to provide arithmetical scale values in the form of electrical impulses that are representative of the algebraic sum of the two variable quantities from the devices 104 and 106. These scale values must be converted into motion in a scale-to-motion device 109 before they can be used along with other motion values from a north and south manual map mover 110 in another algebraic-sum device 111. The manual map mover 110 is controlled from push button switch means 112—113.

The scale-to-motion device 109 has a constant speed motor 550 connected therewith. The algebraic sum in the form of electrical impulses from device 111 is used to operate a north and south map mover 114.

The east and west air speed device 105 and the east and west wind velocity device 107 are electrically connected by suitable repeater mechanism with an algebraic-sum device 115. This device 115 is operative to provide arithmetical scale values in the form of electrical impulses representative of the algebraic sum of the two variable quantities from the devices 105 and 107. These scale values must be converted into motion before they can be used and this is done in the scale-to-motion device 116. The sum from the scale-to-motion device 116 together with other motion values from an east and west manual map-mover 117, are brought together in another algebraic-sum device 118. Suitable switch buttons 119—120 marked "E" and "W," Fig. 1, to designate east and west are provided for controlling the manual map mover 117. A constant speed motor 550 is connected with the scale-to-motion device 116. The sum from the algebraic-sum device 118 is used to operate an automatic east and west map-mover 121.

From the above description it will be seen that the north and south controls shown at the left in Fig. 4 and east and west controls shown at the right in Fig. 4 are similar.

The algebraic sums, as represented by electrical impulses from the algebraic totalizers 108 and 115 respectively, are also connected to suitable repeater motors that control the movement respectively of a north and south direction finder and ground-speed device 94 and an east and west direction finder and ground-speed device 95.

The two devices 94 and 95 control light means and this controls the movement of a direction plate motor 254. Also it controls a scale-to-logarithm device 99 and the scale-to-logarithm device 99 controls the operation of a dial-moving device 98 which moves a dial that registers the ground speed, such as miles per hour.

Aside from the devices that are electrically interconnected as hereinbefore described I provide and show on the diagram in Fig. 4 manually-controlled plate-elevating means 122 controlled by push buttons 123 and operated by an elevating motor 124 to elevate the map plate and the distance plate that carries the scale of miles or other units of distance, proportionately.

Also I provide a fixed air-speed device 125 positioned on an air vehicle where it will be exposed to the full velocity of the air passing the vehicle and connected with a suitable scale-to-log device 126 for converting the reactions of the air-speed device 125 into a logarithmic scale which, in turn, actuates the air speed dial 127 on the instrument.

The instruments and map thus briefly described will provide substantially all of the map information required or needed by a pilot to operate an air craft. The instruments give him the air speed, the ground speed, the components of wind velocity and show him the actual direction in which his ship is traveling relative to the true cardinal directions thus affording him cardinal orientation. The map shows him the exact position of his ship relative to the ground at all times.

Cardinal orientation, as used throughout this specification and in the concluding claims, unless otherwise expressly stated, is defined for the purposes hereof as congruence of cardinal directions between the map, or its image on the view plate, and the earth's surface. Thus, when a cardinally oriented map or its image is placed horizontally, north, south, east and west on said map or its said image, will lie in the respective cardinal directions with respect to the earth's surface and, when the said map is rotated out of its horizontal position, it will rotate on its east-west axis, which thus remains in a horizontal plane, with north on the map above the earth's horizon.

The varous units of the device will now be described in detail.

Master magnetic-compass and true-north follower

Referring to Figs. 5 to 11 inclusive I show a master magnetic-compass and true-north follower, designated on Fig. 4 as 100 and 101 respectively, comprising a housing formed of a cylindrical shell 130 connected with a top flange 131 and having a removable bottom 132. A relatively strong heavy and preferably transparent cover plate 133 is provided in the top of the housing. The cover plate 133 rests on a gasket 134 that is supported on a shoulder 135 of the housing.

A suitable gasket 136 provides a seal between the cylindrical shell 130 and the bottom member 132.

All housing parts are preferably non-magnetic and are air tight and the bottom member 132 and cover plate 133 are hermetically sealed around the edges by the gaskets 134 and 136 thus providing a chamber in which a vacuum may be drawn. The operating parts of the compass are mounted within this vacuum chamber. Iron magnetic shields may be used where desired.

The magnetically actuated part of the compass comprises a magnetic member 137 disposed within an inverted cup-shaped member of non-magnetic material. Preferably the magnetic member 137 is of the usual bar or needle shape and corresponds to the magnetic needle of an ordinary compass. The non-magnetic cup-shaped member is composed of a plate-like end portion 138 and a cylindrical side wall portion 139. The side wall portion 139 forms a light shutter as hereinafter explained.

A tubular hub member 140 is secured to the end portion 138 of the cup-shaped member axially thereof and extends downwardly therefrom at right angles to said end portion 138. The magnetic member 137, see Fig. 6, extends through hub member 140.

Figure 6:
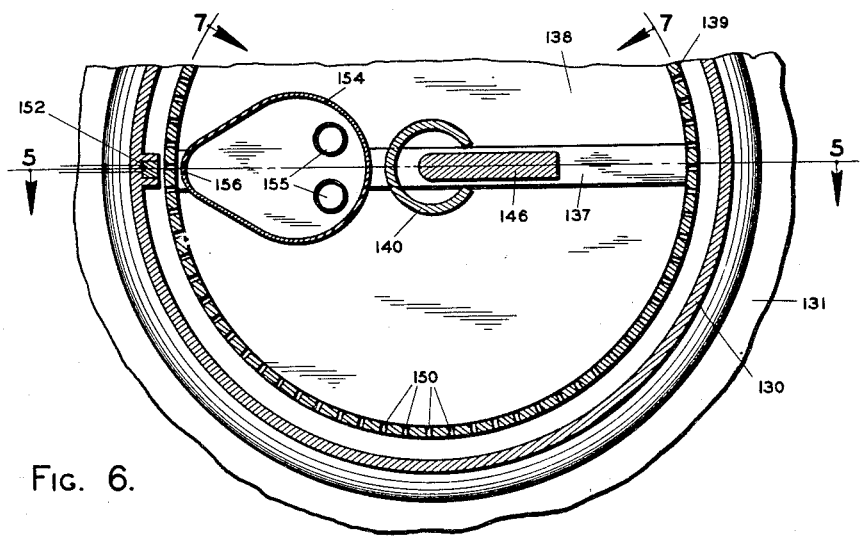
Fig. 6 is a fragmentary sectional view of said master compass taken substantially on broken line 6—6 of Fig. 5.

The hub member 140 preferably has a cross sectional shape of substantially three-quarters of a circle, as shown in Fig. 6. A screw cap 141 is provided on the bottom end portion of hub member 140. An internal flange 177 is preferably provided within screw cap 141 to prevent collapse of the hub member 140 when the cap is tightened thereon.

Figure 5:
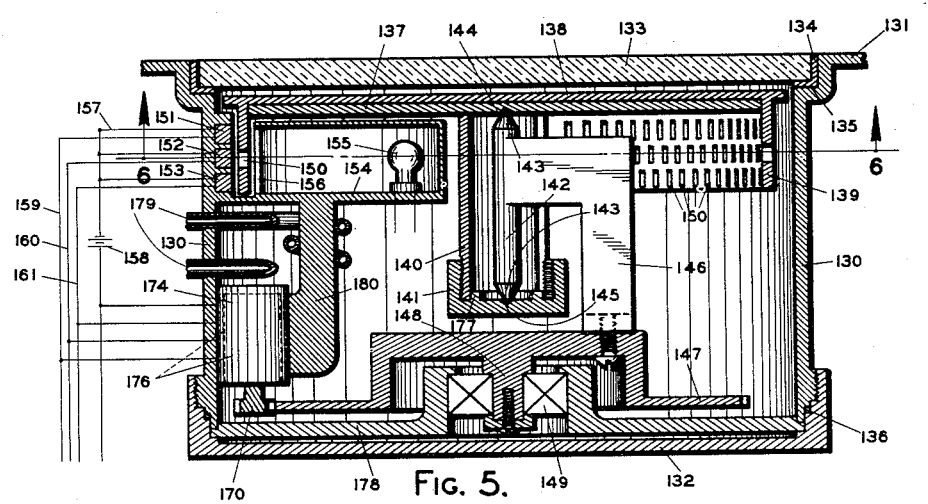
Fig. 5 is a detached view in vertical section taken substantially on broken line 5—5 of Fig. 6 showing a master compass embodied in my invention.
Figure 7:
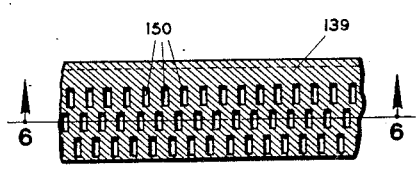
Fig. 7 is a fragmentary sectional development of a light shutter taken substantially on broken line 7—7 of Fig. 6.

The shutter ring 139, Figs. 5, 6 and 7, has a plurality of light apertures 150 provided therein. I have shown a shutter ring 139 formed of material impervious to light and having light apertures 150 in the form of holes therein but obviously this shutter ring may be made of light conductive material painted or coated so as to leave light apertures in the form of light conductive sections instead of the holes 150.

I have shown three annular rows of the light apertures 150 and have shown said apertures 150 to be offset relative to each other transversely of the shutter rings 139 so that the apertures appear to be in slightly inclined rows transversely of the shutter ring. The relative positions of these apertures may be varied as long as an arrangement of said apertures is maintained so that light may pass through only one aperture at a time and may pass through said apertures in proper succession.

Three photo-electric cells 151, 152 and 153 are supported in a common axial plane by the frame 130 in close proximity to the outer circumference of the shutter ring 139. One of the cells 151, 152 and 153 is positioned in alignment with each annular row of light apertures 150.

A source of light is positioned within the shutter ring 139 directly opposite the photo-electric cells 151, 152 and 153.

Preferably this source of light comprises a housing 154 having a plurality of lamps 155 therein and having a narrow upright slot 156 positioned close to the inside of the shutter ring 139 and directly opposite the photoelectric cells 151, 152 and 153.

The rear wall of the housing 154 is preferably of concave shape and the walls of said housing are mirrored so as to reflect the light forwardly and concentrate this reflected light at the location of the slot 156.

The photo-electric cells 151, 152 and 153 act as electric valves which permit a flow of electric current therethrough when a beam of light is incident thereon and shut off the flow of electric current when no light is incident thereon.

Each photo-electric cell 151, 152 and 153 is connected by a common circuit wire 157 with a source of supply of electric current, such as a battery 158. Also said photo-electric cells 151, 152 and 153 are connected by circuit wires 159, 160 and 161 with sets of coils 162, 163 and 164 of a repeater type electric motor shown diagrammatically in Figs. 8, 9 and 10.

Figure 9:
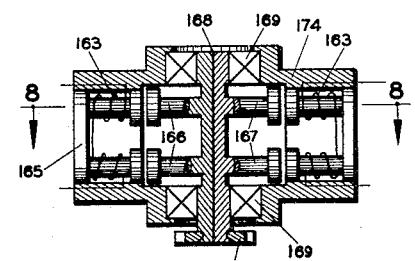
Fig. 9 is a diagrammatic view with parts in section of said repeater motor taken substantially on broken line 9—9 of Fig. 8.

I have shown a repeater type electric motor 174 with six equidistantly spaced pole pieces 165 each embodying a north and a south pole, see Fig. 9.

Figure 8:
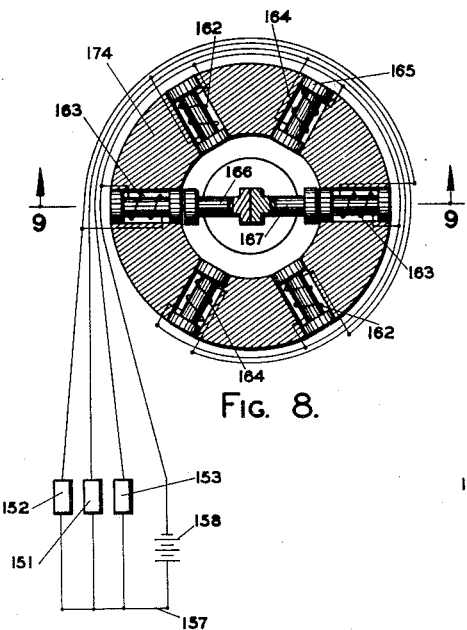
Fig. 8 is a diagrammatic view of a repeater motor embodied in this invention taken substantially on broken line 8—8 of Fig. 9.

The sets of coils 162, 163 and 164 each consist of four coils disposed two each on diametrically opposite pole pieces, i. e., two of the coils 162 are wound in opposite directions on one pole piece 165, as shown in Fig. 9, and the other two coils 162 are wound on the diametrically opposite pole piece 165, see Fig. 8. Thus each pole piece 165 is provided with a north and south pole.

The rotary portion of the motor consists of two horseshoe type preferably permanent magnets 166 and 167 rigidly secured together in back to back relation and extending in opposite directions as shown in Figs. 8 and 9. A strip of insulating material 168 is preferably provided between the two magnets 166 and 167. The magnets 166—167 are journaled in bearings 169 and have a gear pinion 170 connected therewith. Obviously the permanent magnets 166 and 167 may be electromagnets if desired.

The closing of the electric circuits through the sets of coils 162, 163 and 164 is controlled by the respective photo-electric cells 151, 152 and 153 in response to relative movement between the cylindrical light shutter 139 and the photo-electric cells and light source.

As the shutter 139 and photo-electric cells and light source relatively move rotatively the light will fall on the photo-electric cells successively thus successively energizing the different sets of coils 162, 163 and 164. If the shutter ring 139 moves in one direction relative to the source of light such as clockwise as respects the showing in Fig. 6 (this being equivalent to moving the shutter 139 to the left or the light source to right as respects the showing in Fig. 7), then the photoelectric cells will be exposed in the order 151—152—153 and the magnet coils will be energized in the order 162—163—164, and the device will repeat in this order as long the shutter ring continues to relatively move in the same direction. This will rotate the magnets 166 and 167 in a clockwise direction as respects Figs. 8 and 10.

If the shutter ring 139 relatively moves in the opposite direction, then the order in which the circuits through the coils will be closed will be reversed and the order in which the energizing of the coils will be repeated will be 164—163—162. This will rotate the magnets 166 and 167 counterclockwise, as respects the showing in Fig. 8.

The gearwheel 147 that carries the bracket 146 and bearing pin 142 is controlled by a repeater motor 174 of the type shown in Figs. 8 and 9. The repeater motor 174 is positioned within the housing 130 and the gear pinion 170 of said motor is meshed with the gearwheel 147.

The repeater motor 174 is electrically connected with the photoelectric cells 151, 152 and 153 in such a manner as to always provide rotation of the follower mechanism in the same direction and at the same angular velocity as the magnetic member 137.

In this connection it is to be remembered that rotary movement of the magnetic member is a movement relative to the housing 130—131—132 and that the magnetic member really tends to remain in a fixed or magnetic north position while the housing moves rotatively relative to this member.

When relative movement in one direction between the housing and the magnetic member starts it will only have to change the relative position of the shutter ring 139 enough to obstruct the light from one photo-electric cell and allow light to fall on the next cell to cause the follower mechanism to start to follow the magnetic member. As long as the relative movement between the housing and the magnetic member continues the follower mechanism will follow the magnetic member and the rotary movement will take place on the bearing 149 thereby relieving the more delicate bearings 143—144 of substantially all frictional resistance and wear. When the magnetic member comes to rest relative to the housing the follower mechanism will also come to rest.

If the relative direction of movement of the magnetic member and housing is reversed, the follower mechanism will follow the magnetic member in the new direction.

Slight variations or fluctuations of the magnetic member are taken care of on the needle point or jewel bearings 143-144 without starting operation of the following mechanism.

To obviate all possibility of the magnetic member 137 being influenced by electromagnetic lines of force emanating from the motor 174 I preferably provide a shield for this motor such as an annular soft iron housing 176 of inverted U-shape in cross section. This housing 176 is coaxial relative to the magnetic member 137 so that if any magnetism emanates from the motor 174 it will be uniformly distributed by the housing 176 and will not cause any deviation of the magnetic member 137. It is obvious that any other magnetic screening means may be employed, such as to arrange the follower motor control of the device so that its axis is coincident with the axis of the device and gear 147 is driven by a planetary train of gears therefrom.

As the lamps 155 and electric repeater motor 174 will necessarily give off some heat and as a vacuum is preferably drawn within the compass housing I preferably provide cooling means for taking care of this heat. This cooling means preferably consists of a cooling-liquid conduit 179 which extends through the walls of the housing member 130 and is coiled about a metal bracket 180. The metal bracket 180 is of high thermal conductivity and is connected with both the motor 174 and the lamp housing 154 so that heat from both the motor 174 and housing 154 are drawn off rapidly.

The liquid conduit members 179 are brazed or otherwise sealed where they pass through the wall of housing member 130.

The disc 138 may have suitable graduations printed on its top surface which are visible through the glass cover plate 133 to give the desired compass reading. This reading will give the magnetic north rather than the true north.

Permanent adjustment between the disc 138 and magnetic member 137 may be made at the time the compass is assembled to take care of any magnetic deviation existing due to magnetism other than the earth's magnetic field, particularly magnetism inherent in the device or vehicle on which it is mounted.

Figure 10:
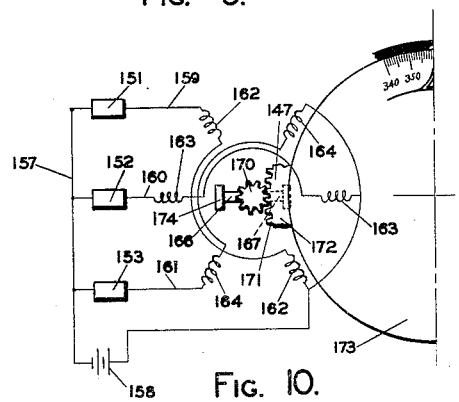
Fig. 10 is a diagram of the repeater motor of Figs. 8 and 9 and parts connected therewith.

Fig. 10 is a diagrammatic view of repeater mechanism using the motor shown in Figs. 8 and 9 for operating a dial which may be located at a point remote from the compass shown in Fig. 5.

In said Fig. 10 the photo-electric cells 151, 152 and 153 and circuit wires 157, 159 and 160 and 161 and coils 162, 163, and 164 and magnets 166 and 167 are all shown diagrammatically.

Another pinion 170, on another similar repeater motor 174, connected with similar magnets 166 and 167, meshes with gearteeth 171 on a flange 172 of a magnetic-north indicator ring 173, Fig. 10.

The ratio of the gears 170 and 172 is such as to provide movement of the magnetic north indicator ring 173 in exact synchronism with the movement of the magnetic member 137 and the disc or dial member 138.

Obviously as many as desired of the repeaters of the type shown in Figs. 8, 9 and 10 may be operated from the photo-electric cells 151, 152 and 153.

When the compass shown in Figs. 5 to 10 is in use the magnetic member 137 will seek a position in which it will point to the magnetic north. This magnetic member will always be free to move in vacuum on the needle point or jeweled bearings which offer the least possible amount of frictional resistance. Immediately after relative movement between the magnetic member 137 and the housing commences, the circuits to the magnet coils of the repeater motor 174 are successively closed and the follower mechanism follows the magnetic member so that there is no further movement on the needle point or the jeweled bearings. If movement between the magnetic member 137 and housing 130 slows down or stops or reverses in direction the follower mechanism does the same, as it is controlled by the passage of light through the openings 150 in the shutter 139 and the shutter 139 is controlled by the magnetic member 137.

The compass is thus very accurate and very reliable and very durable. The bearing 149 that carries the follower mechanism is strong and substantial and will last indefinitely. The bearings on which the magnetic member 137 depends for its sensitivity are substantially frictionless and are only subjected to a very slight amount of wear.

The repeater mechanism is controlled by the magnetic member without any actual contact of moving parts and for this reason does not detract from the sensitivity of the magnetic member. The repeater motors that are controlled by the photo-electric cells derive their current from an external source and are reliable and efficient. As many of these repeater motors as may be desired can be operated from a single set of photoelectric cells.

The mechanism is all sealed in a substantial vacuum thereby safeguarding this mechanism against dirt in all forms, moisture and corrosion. Also sealing this mechanism in a vacuum safeguards it against the action of air resistance.

The master magnetic compass may be located on any part of the vehicle. The conductors 157, 159 and 160 and 161 from the photo-electric cells 151, 152 and 153 extend to the magnetic-north follower-motor shown diagrammatically in Fig. 10. This magnetic-north follower-motor, shown diagrammatically in Fig. 10 is mounted within the housing 175 shown in Fig. 11 with its pinion 170 meshed with the gearteeth 171 provided on the flange 172 of the cylindrical magnetic-north indicator ring 173. The upper edge portion of the ring 173, Fig. 11, is preferably flush with the top surface of a map stand or instrument board 181 which is fixed relative to the instrument and carries a ship's heading index mark 91.

Figure 11:
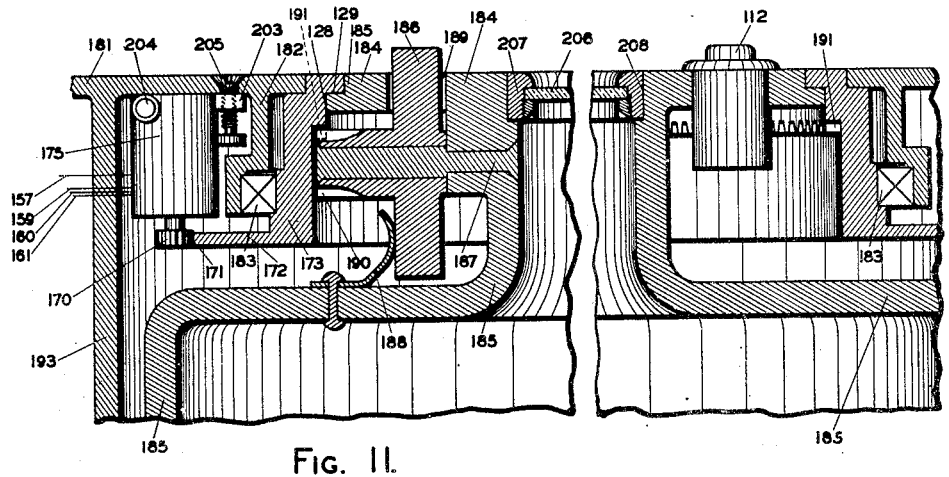
Fig. 11 is a fragmentary sectional view taken substantially on broken line 11—11 of Fig. 1 showing true north correction devices.

Parts 172—173, Fig. 11, are journaled in a downwardly extending flange 182 of board 181 by a bearing 183.

A rotatable true-north dial 184, Fig. 11, of annular shape is positioned just within the flange 182 and rigidly connected with a rotatable housing member 185. Parts 184 and 185 are also supported by bearing 83.

A thumb turn wheel 186 is rotatively mounted on a bearing member 187 that is rigid with the housing member 185 and projects outwardly therefrom. A friction member 188 yieldingly engages the thumb wheel 186 to prevent accidental or vibratory turning thereof.

The upper portion of the thumb wheel 186 extends through a slot 189 in the true north dial 184 into a position where it may be conveniently engaged by the thumb or finger of the operator for turning the same.

Figure 1:
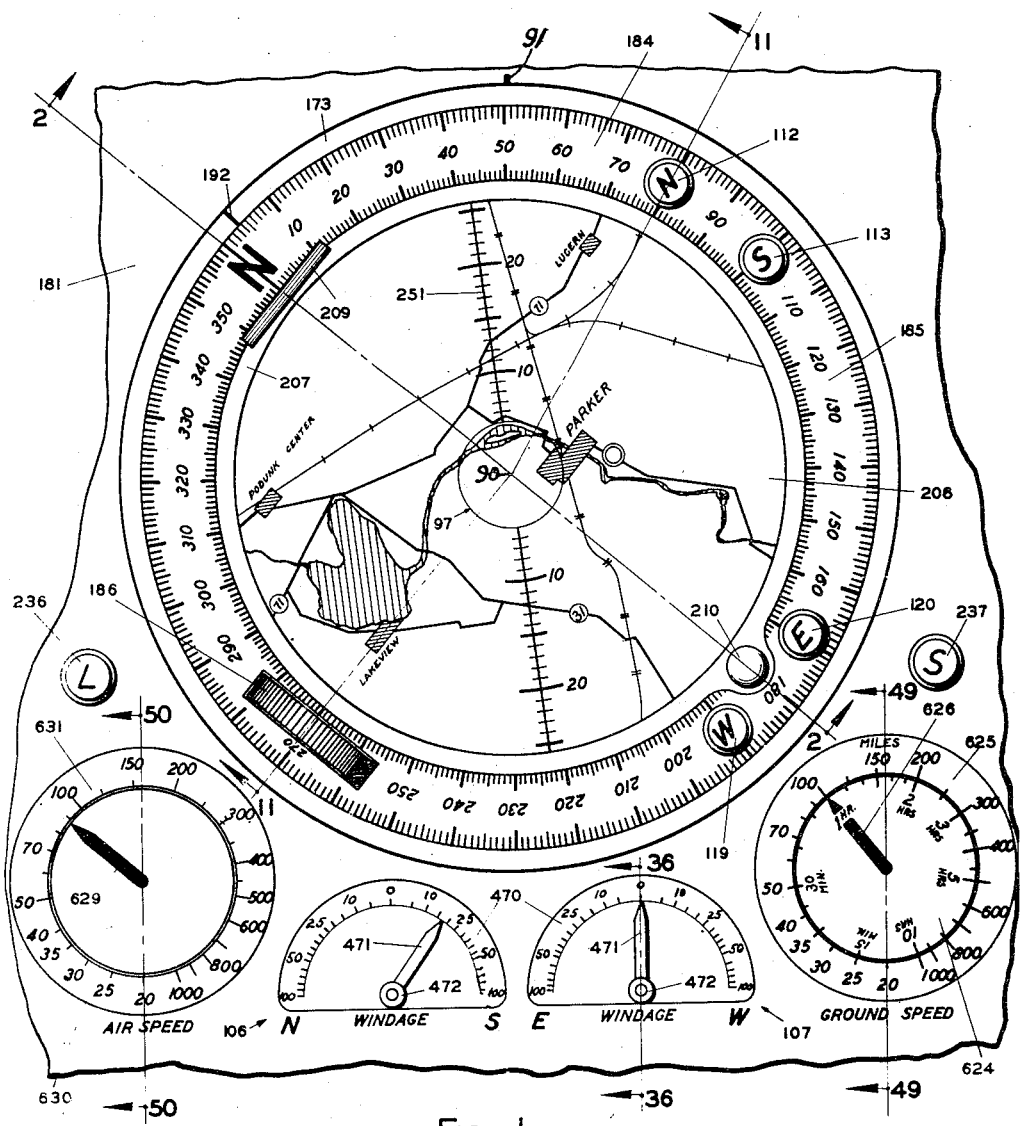
Figure 1 is a plan view showing the instrument board of a ground following map and navigation instrument that is constructed in accordance with my invention.

The thumb wheel 186, Figs. 1 and 11, has a gear means 190 thereon that meshes with another gear means 191 on the magnetic north indicator ring 173.

The magnetic north indicator ring 173 has a reference mark 192 thereon as shown in Fig. 1, that always indicates magnetic north. The true north dial 184 is preferably graduated in degrees as shown in Fig. 1.

The housing 185 is rotatably supported by the bearing 183 and by other means hereinafter described, and the thumb wheel 186 and gear means 190 and 191 serve as adjustable means for securing the rotatable housing member 185 to the magnetic north indicator ring 173 so that these two parts ordinarily move as one unit.

However when they move relative to each other by operation of thumb wheel 186, mating surfaces 128 and shoulders 129 between members 185 and 173 provide the necessary bearing engagements.

The magnetic declination or variation at different locations on the earth as known and readily available in table and chart form and adjustment for this magnetic declination or variation can be made by turning the thumb wheel 186 and rotatively moving the true north dial 184 relative to the magnetic north ring 173.

After the magnetic declination or variation has been thus adjusted so that the dial 184 will indicate the true north when the ring 173 indicates the magnetic north the housing member 185 and ring 173 will be controlled by the follower motor in housing 175 and will operate as a unit to always provide both a correct true north reading and a correct magnetic north reading.

The motor housing 175 is preferably secured to a bracket 203, Fig. 11, that is connected with the instrument board 181 by a pivot 204 and a screw 205.

By loosening the screw 205 the pinion 170 may be moved about pivot 204 out of mesh with the gear 171 and the magnetic north follower elements 172—173 adjusted to bring it into correct step with the compass that it is to follow.

Throughout the drawings I have shown batteries 158 as illustrative of a source of electrical energy. All of these batteries are numbered 158. It will be understood that any suitable source of current may be used instead of these batteries, or one battery may serve for a group or all.

*Main map stand and housing means*

The main map stand and housing means, see Figs. 1, 2, 3, 11, 12, 13, 14 and 15 has a face comprising an instrument board 181 shown in Fig. 1 which includes the parts 173, 181, 184 and 185 just hereinbefore described.

The vertical in Fig. 1, passing through center 90 and index mark 91, is parallel with the fore and aft axis of the craft and mark 91 indicates the line of apparent direction or heading of the craft which is read on the scale of dial 184 while distance and direction scale 251 shows the real line of movement of the craft and the angular difference about center 90 between scale 251 and mark 90 shows the wind drifts.

Figure 2:
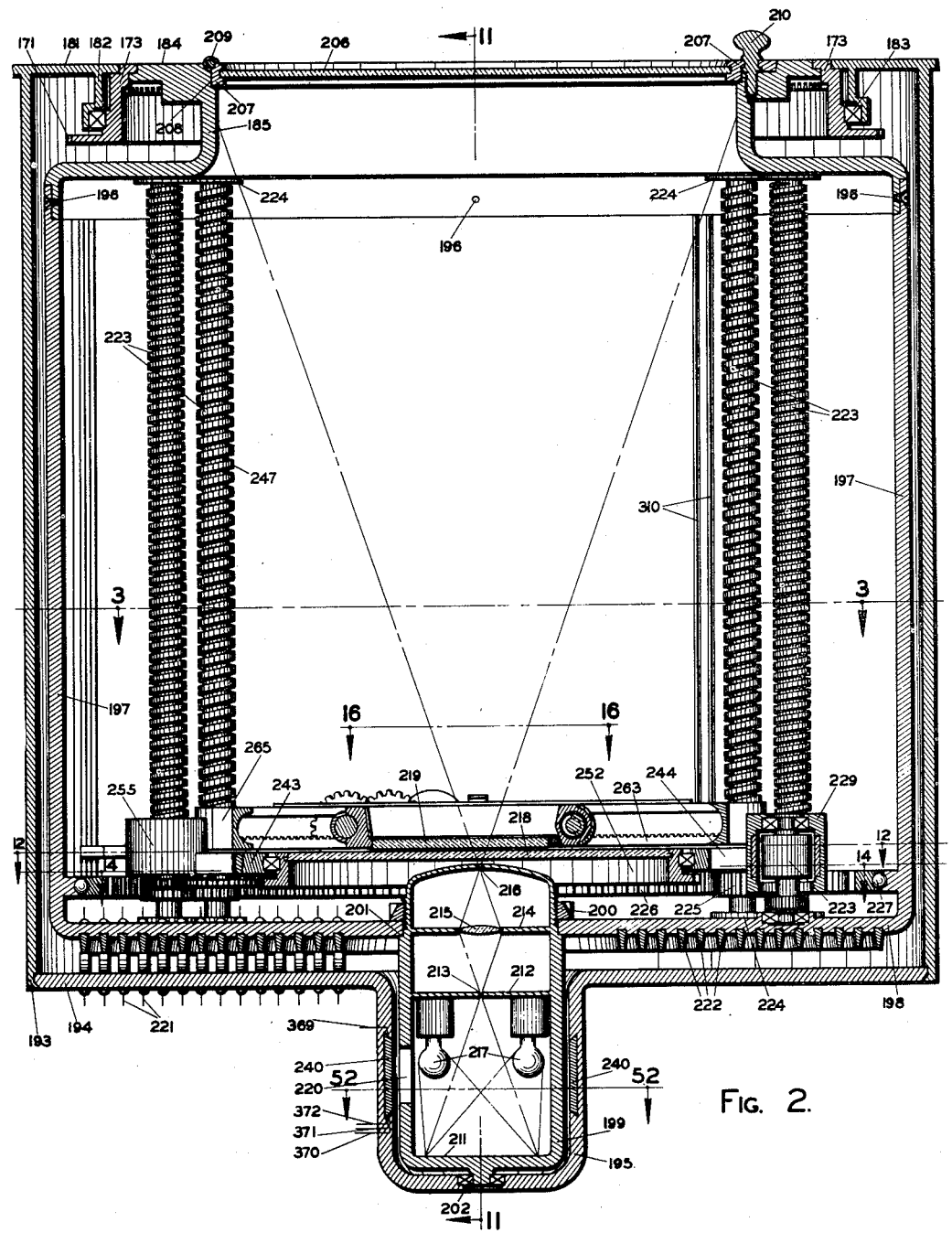
Fig. 2 is a vertical sectional view of the same taken substantially on broken line 2—2 of Figs. 1, 3, 12 and 14, parts being shown in elevation.

The instrument board 181, Fig. 2, supports an outer fixed cylindrical housing 193. The housing 193 has an annular bottom member 194 preferably formed of electrical insulating material and this bottom member 194 is centrally provided with a downwardly extending cylindrical receptacle 195 also preferably formed of electrical insulating material.

The rotary housing part 185 is disposed within the fixed housing 193, Fig. 2, and is secured by means such as screws or rivets 196 to a lower housing part 197. The lower housing part 197 has a bottom 198. Parts 197 and 198 are preferably formed of electrical insulating material.

A light projector housing 199, Fig. 2, extends through a suitable opening in the bottom 198 of the rotatable housing member 197 and is secured thereto by means such as a nut 200 that securely clamps the bottom member 198 against a shoulder 201 on the projector housing 199. The projector housing 199 is journaled in a bearing member 202 in the bottom of the well portion 195. The bearing member 202 rotatively supports the lower end portion of the housing 199—198—197—185 and the upper end portion thereof is rotatively supported by the bearing member 183.

This mounts this housing so that it may be easily moved rotatively.

The top portion of this rotatable housing is provided with a circular view plate 206 preferably of glass frosted or ground on its lowermost surface and adapted to have an image of a map and a scale of miles projected thereon. The view plate 206 is preferably mounted in a frame 207 that seats on a gasket in a suitable annular notch 208 in the housing member 185. A hinge 209 connects the frame 207 with the housing member 185 at one point and a thumb screw 210, positioned preferably at a diametrically opposite point, releasably connects the frame 207 with the housing member 185.

The above described construction makes it possible to raise the view plate 206 to provide access to the interior of the housing for changing maps as hereinafter described.

The interior of the projector housing 199, Fig. 2, is suitably finished to provide flat white reflecting surfaces 211 and is preferably provided with one partition 212 having a relatively small central light aperture 213 and with another partition 214 having a double convex lens 215 therein. The upper end of the projector housing 199 is provided with a relatively small light aperture 216 through which light may be projected outwardly through a direction and distance plate 218, Fig. 12, and through a map plate 219, Figs. 16 to 26, as is more fully explained hereinafter.

Dead white and dead black walls are provided throughout the device wherever desired to reflect or prevent reflection of light, respectively.

Lamp globes 217 or other light providing means are provided in the housing 199 to furnish light.

Also a narrow slot 220 is provided in one side of the rotatable housing 199 for the emission of a blade of light onto a light responsive grid 240 in the fixed housing 195 which grid forms part of the true north follower control mechanism hereinafter explained in detail and used to control various mechanisms. This is shown in enlarged section, Fig. 52.

Figure 51:
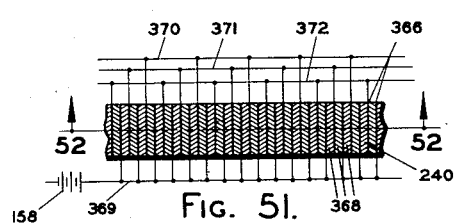
Fig. 51 is a fragmentary diagrammatic development of a cylindrical light responsive grid embodied in the housing and light projector structure shown in Fig. 2, said view being taken on line 51—51 of Fig. 52.
Figure 52:
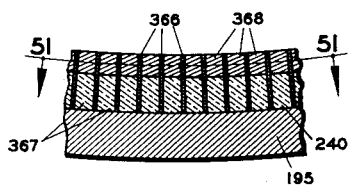
Fig. 52 is a fragmentary sectional view on a larger scale of said grid, taken on line 52—52 of Figs. 20 and 51.

The grid 240, Figs. 51 and 52, comprises a plurality of spaced apart parallel plates 366, Fig. 52, of electrically conductive material spaced apart by spacers 367 of electrical insulating material of less depth than the plates 366 to leave pockets between the plates, which pockets are filled with light responsive material 368, such as selenium.

Preferably a coating of transparent material such as varnish, shellac, cellulose acetate, glass or the like is provided over the light responsive material 368 as a protective covering. The grid 240 extends entirely around the housing 195.

Every alternate plate 366 of the grid 240 is connected with a common electrical conductor 369. The other plates 366 are connected in rotation as shown with three electrical conductors 370, 371 and 372.

As the housing 199 is rotated the slot 220 therein emits a blade of light which moves over the cells 368 of the grid 240. When this blade of light is incident on a cell 368 of light responsive material it increases the electrical conductivity of the cell and allows a flow of electric current between the plates 366 which form the sides of the cell thus completing the circuit between conductor 369 and one of conductors 370, 371 and 372.

If the blade of light is moved in one direction, such as toward the left as respects the showing in Fig. 51, the circuits between the common conductor 369 and the conductors 370, 371 and 372 will be progresesively closed in the order 370, 371, 372. If the blade of light is moved to the right as respects the showing in Fig. 51 then these circuits will be progressively closed in the reverse order 372—371—370, as will be obvious from Fig. 51. Shortly after one of these circuits is closed in each instance the previously closed circuit will be broken.

These circuits will thus operate any repeater motor of the type of construction disclosed in Figs. 8, 9 and 10 in exactly the same way as the circuits shown and described in connection with Fig. 10 operate the motor therein shown.

Electric impulses from various sources must be conducted into the rotary housing 197, Fig. 2, as hereinafter described. To facilitate this I provide in the bottom 194 of the outer fixed housing a plurality of brush terminals 221 that contact annular conductor bar or ring members 222 in the bottom portion 198 of the rotary housing 197—185.

*Map and direction plate supporting and moving mechanism*

Figure 3:
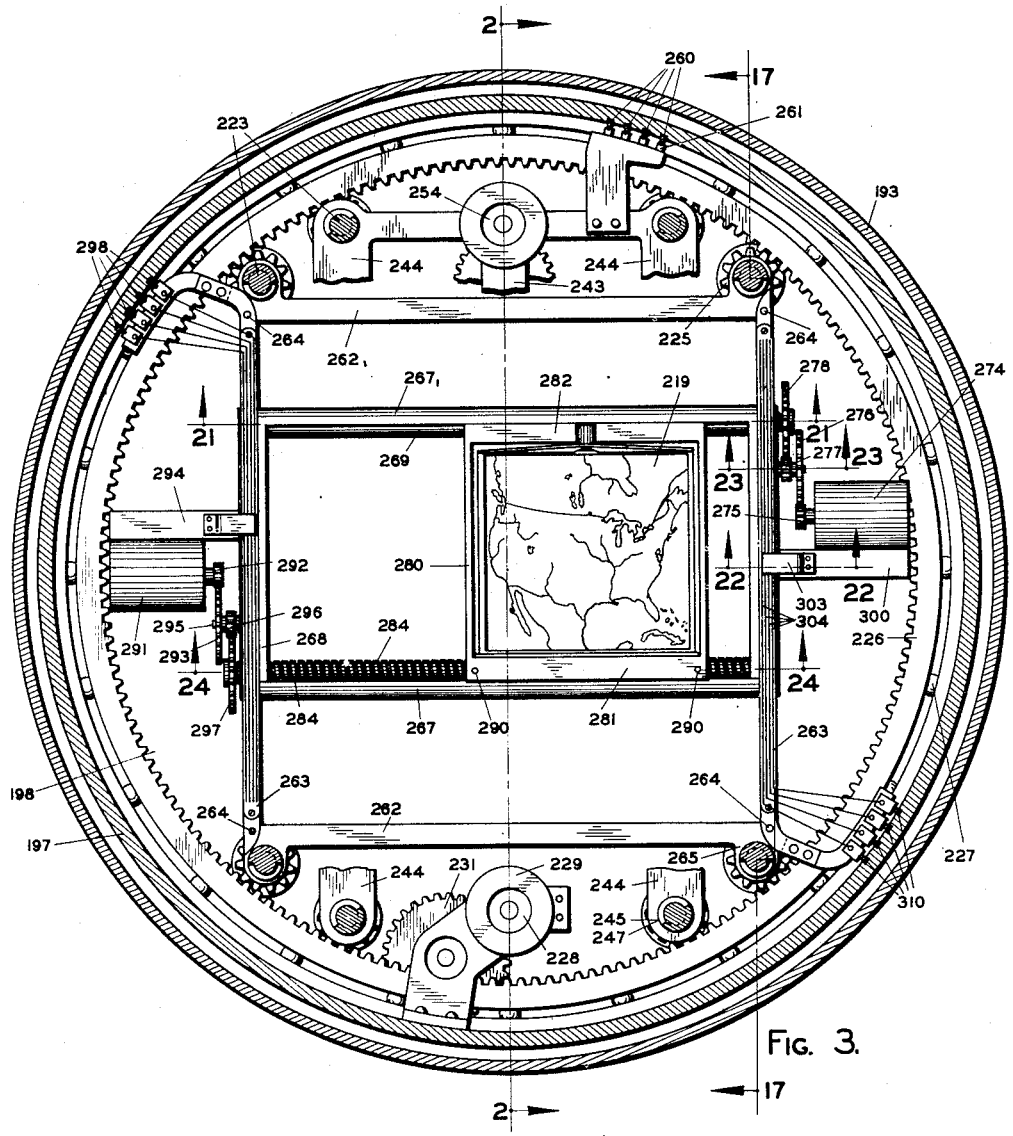
Fig. 3 is a horizontal sectional view taken substantially on broken line 3—3 of Fig. 2 parts being shown in plan.

The map and direction plates and the means for supporting and moving the same are positioned within the inner rotatable housing 197. These parts are shown in Figs. 2 and 3 and also in Figs. 12 to 26, inclusive.

Eight upright threaded screw members 223, Figs. 2, 3, 12, 13, 14, 16 and 17, support these parts for vertical movement within the inner rotatable housing member 197. These screw members 223 are all positioned at the same radial distance from the center of the housing 197 and are journaled in suitable bearings 224, Fig. 2, in the bottom portion 198 and top portion 185 of said rotatable housing.

Figure 12:
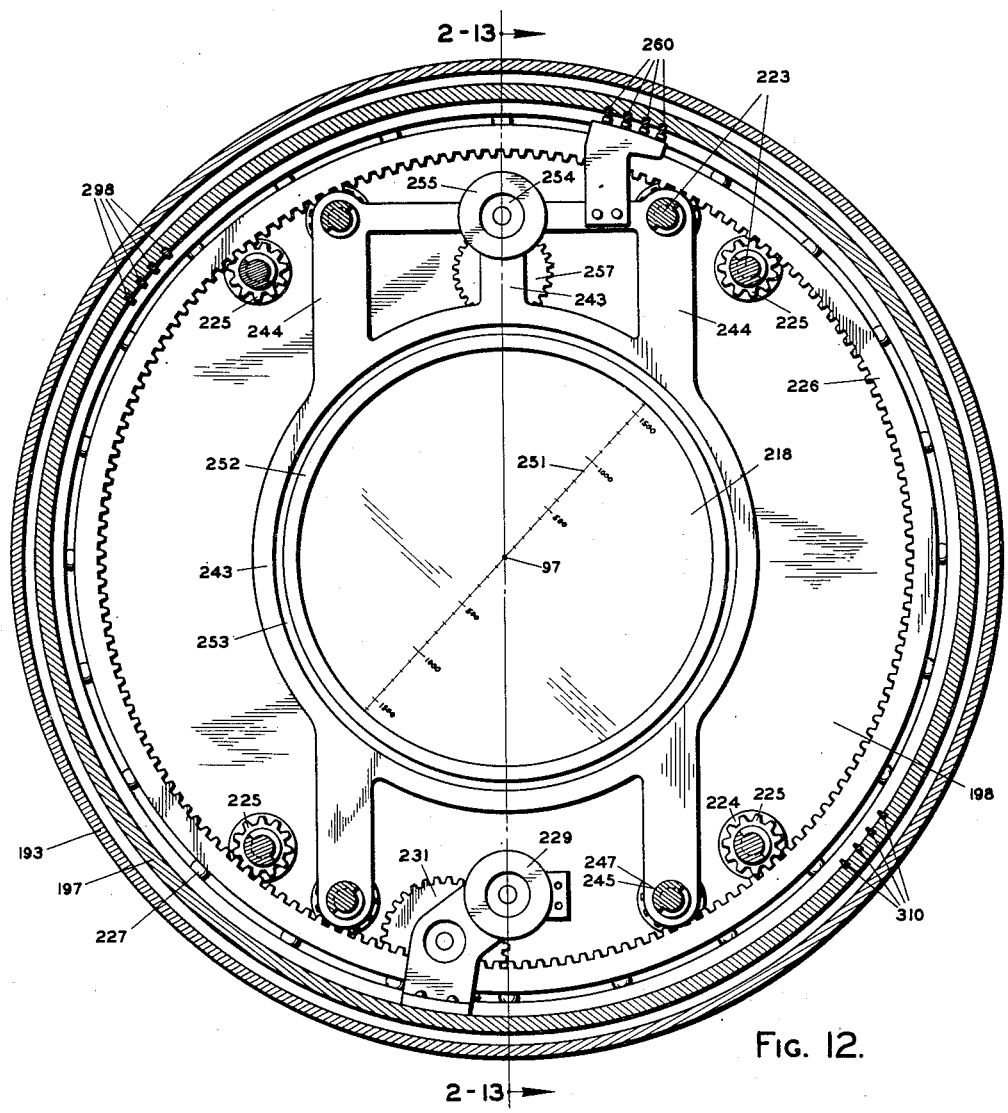
Fig. 12 is a cross section taken substantially on broken line 12—12 of Figs. 2 and 13 showing a distant scale and direction plate and means for rotatively moving the same.
Figure 14:
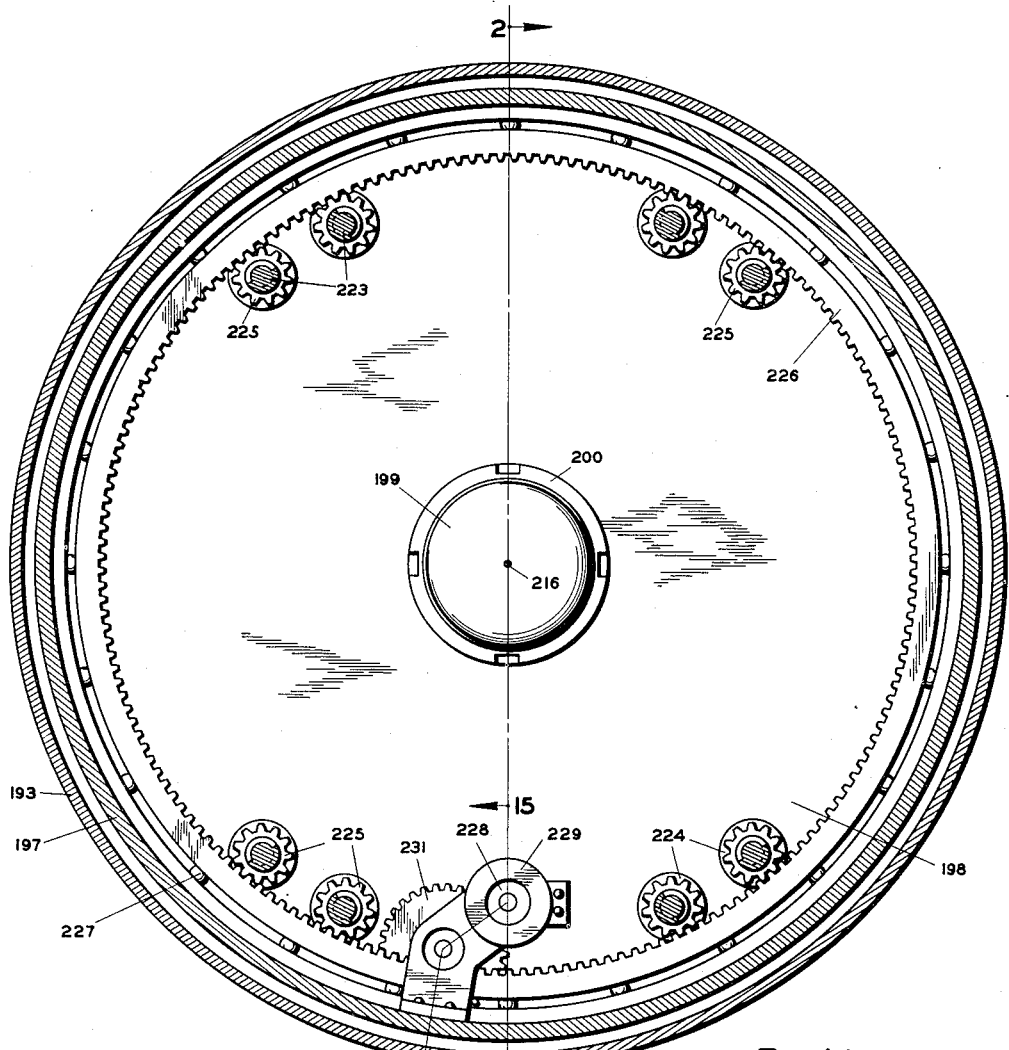
Fig. 14 is a cross section taken substantially on broken line 14—14 of Fig. 2 showing plate elevating means.
Figure 15:
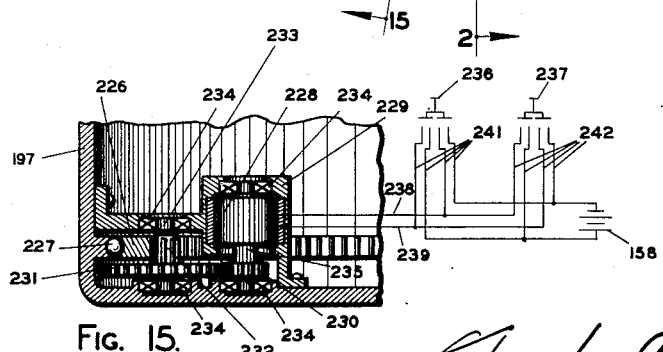
Fig. 15 is a fragmentary sectional view, taken substantially on broken line 15—15 of Fig. 14, showing parts of the plate elevating means and showing electrical control means diagrammatically.

Each screw member 223, Fig. 2, 12 and 14, is provided near its lower end with a gear pinion 225 that meshes with an internally toothed ring gear 226. The ring gear 226, Figs. 2, 14 and 15, is rotatively supported within the rotatable housing 197 by ball bearing means 227. Rotary movement of the ring gear 226 will rotate all of the upright threaded posts 223 in the same rotary direction and at the same rate of speed.

The ring gear 226 is driven by a reversible motor 228, Figs. 14 and 15, supported in a bracket or housing 229 and operatively connected by a pinion 230, a gearwheel 231 and a pinion 232 with the ring gear 226.

The shaft 233 to which the gearwheel 231 and pinion 232 are rigidly connected is journaled in bearings 234. Also the motor shaft 235 is journaled in similar bearings 234.

The motor 228 is preferably controlled by two push buttons 236 and 237 on the instrument board 181, Fig. 1. The push button 236 is preferably marked "L" to indicate that the depression of this push button will show a large scale representation of a small portion of the map area while the push button 237 is marked "S" to indicate that its depression will show a small scale representation of a larger portion of the map area.

The push buttons 236 and 237 are of the spring actuated type and will only maintain their circuits closed as long as they are held down.

The wiring connections to the push buttons 236 and 237 are diagrammatically shown in Fig. 15. In said Fig. 15, 238 and 239 are two conductors connected with the motor 228, and 158 is a source of electrical energy, such as a battery. If switch 236 is closed the conductors 238 and 239 will be connected in one order, principally by conductors 241, with the source 158 and if switch 237 is closed conductors 238 and 239 will be connected in a reverse order, principally by conductors 242 with the source 158.

This provides for operating the motor 228 in one direction by the closing of switch 236 to move, in one direction, the parts supported by the threaded posts 223 and operating the motor 228 in the reverse direction by the closing of switch 237 to reversely move the parts supported by the threaded posts 223.

The electrical connections to motor 228 enter the housing 197—198 through brushes 221 and conductor rings 222 hereinbefore described.

The frame that carries the map is a rectangular frame and is positioned above the frame that carries the direction plate as shown in Figs. 2 and 3.

Figure 13:
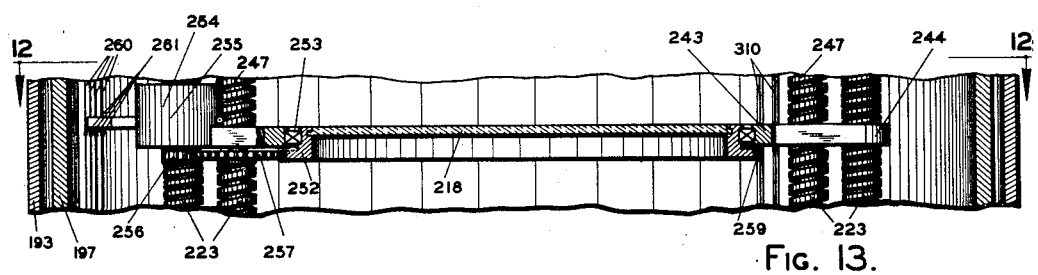
Fig. 13 is a fragmentary sectional view taken substantially on broken line 13—13 of Fig. 12.

The distance scale and direction plate frame 243, Figs. 2, 12 and 13, is of generally circular shape and is provided with four outwardly protruding bracket members 244, Figs. 2, 3 and 12 and 13 that are operatively connected with four of the threaded posts 223.

The lead of the threads on the four threaded posts 223 that support the scale of miles plate frame 243 is slightly less than the lead of the threads on the four threaded posts 223 that support the map plate so that the scale of miles plate and map plate move away from and toward each other when they are raised and lowered respectively to always project the correct scale of miles onto the view plate as hereinafter explained.

The means used to connect the bracket members 244, Fig. 12, with posts 223 is preferably by square threads 247 on said post 223 operating in mating thread grooves 245 tapped in frames 244 so that when posts 223 are rotated the frame 244 is actuated thereby vertically up or down.

The distance scale and direction plate frame 243 has a direction plate ring 252, Fig. 13, rotatively mounted therein by bearings 253. The ring 252 has the direction plate 218 fixedly mounted in it, as shown in Figs. 12 and 13. The direction plate 218 is of transparent material such as glass and has a combined direction line and scale of distance units 251 marked on the upper surface thereof as shown in Figs. 1 and 12. Preferably the scale of distance units and direction line 251 will be put on the direction plate 218 by a photographic process. Also preferably a circle 97, as shown, is provided in the center of the scale of miles and direction plate in the scale of miles line 251.

The direction plate ring 252 is adapted to be rotatively moved within the direction plate frame 243 by a repeater motor 254. The repeater motor 254 is similar to the motor shown in Figs. 8, 9 and 10 and said repeater motor 254 is shown diagrammatically in Figs. 12 and 13.

The repeater motor 254 is mounted in a housing 255 that is rigid with the direction plate frame 243 and is connected by a pinion 256, and gearwheel 257 with gear teeth 259 that are provided on the periphery of the direction plate ring 252.

The repeater motor 254 thus provides a means for imparting rotary movement in either direction to the direction plate 218 upon which the scale of miles and direction line 251 are shown.

Electrical energy for operating the repeater motor 254 is brought in through the brush terminals 221 and conductor rings 222, Fig. 2, to upright conductor bars 260, Figs. 3 and 12, that are engaged by brushes 261 which are connected with the coils of the motor 254.

The electrical energy for operating this repeater motor 254 is controlled by a direction finder and ground speed device hereinafter described.

The main map frame that carries other frames which support the map plate 219 is of substantially square outline, Fig. 3, and is made up of two end members 262 and 262₁, see also Figs. 16 to 26, that are somewhat inversely similar to each other and two side members, also inversely similar to each other. The side members are each formed of two side bars 263 positioned crosswise of the end members 262 and 262₁ and secured thereto by rivets 264.

The side bars 263, Figs. 3, 16, 17 and 25, are curved at their ends and the end portions of said side bars through which the rivets 264 extend are seated in notches 289, Figs. 16 and 17, in the end members 262 and 262₁. The top and bottom surfaces of the end members 262 and 261₁ and side bars 263 are flush, as best shown in Fig. 17.

Members 262 and 262₁ are provided with four outwardly extending bracket portions 265 that have thread grooves 246 which mate with threads 248 of posts 223 shown in Fig. 17.

The inner side of each end member 262 and 262₁ has a concave groove 266 and 266₁ of substantially semicircular cross section extending throughout the entire length thereof.

A rectangular frame, hereinafter termed the north and south map frame because movement thereof moves the map north and south on a view plate, is carried by the main map frame. This rectangular north and south map frame comprises side bars 267 and 267₁ and end bars 268. The end bars 268 are supported for movement between the previously described bars 263 of the main map frame. These end bars 268 are guided between the side bars 263 as shown in Figs. 16 and 17.

The side bars 267 and 267₁ are of approximately semi-circular cross section with their convex sides directed toward the concave grooves 266 and 266₁ of the side bars 262 and 262₁ respectively. Screws 270, Figs. 16 and 17, secure the side bar 267 and end bars 268 together. Preferably side bar 267₁ is brazed to end bars 268 forming an integral assembly.

The semi-circular cross sectional shape of the side bars 267 and 267₁ provides a strong and substantial construction and economizes space to a maximum degree. The side bars 267 and 267₁ being convex on their outer sides, will fit within the arcuate recesses 266 and 266₁ respectively in the end members 262 and 262₁ when they are moved into engagement with said end members.

This will occur when the north and south map frame is moved a maximum distance in either direction, i. e., toward the top or bottom of the drawing as respects the showing in Fig. 3, or toward the right or left as respects the showing in Figs. 16 and 17.

The concave cross sectional shape of the inner side of the bar 267₁, shown at the right in Figs. 16 and 17, provides room for a shaft 269 which extends longitudinally of the side bar 267₁ and is used for moving the north and south map frame 267—267₁—268 crosswise of the main map frame in directions parallel to the side bars 263, Fig. 3.

The shaft 269 is shown in Figs. 16, 17 and 21. It is journaled in bearings 271, Fig. 21, in the frame members 268, see Figs. 16, 17 and 21, and is provided at both ends with pinions 272, Figs. 16 and 21, that mesh with gear rack teeth 273 on the lowermost frame bars 263. Rotation of the shaft 269 will move the rectangular north and south map frame 267 and 267₁ and 268 in an up or down direction as respects the showing in Fig. 3.

The means for driving the shaft 269 to move the north and south map frame 267—267₁—268 comprises a repeater motor 274, Fig. 3, carried by a bracket 300, Figs. 3 and 22, that is secured to the north and south map frame and having a pinion 275 that meshes with a gearwheel 276, Figs. 3 and 23. The gearwheel 276 is mounted on a bearing shaft 279 that is secured to the north and south map frame member 268 and said gearwheel 276 is provided with a fixedly connected pinion 277 that meshes with a gearwheel 278, Fig. 21, on the shaft 269.

The repeater motor 274 is similar to the repeater motor shown in Figs. 8 and 9 and hereinbefore described in detail.

The repeater motor 274 is controlled jointly by the north and south air speed indicator means 104, Fig. 4, and north and south wind velocity instruments 106, Fig. 4, acting through light controlled devices as hereinafter shown and described.

Electrical energy to operate the repeater motor 274 is conducted to said repeater motor by means shown in Figs. 22, 25 and 26. This means comprises motor conductors 301 that are connected with said motor and, in turn, with brushes 302. The brushes 302 are supported by an arm 303, Figs. 3 and 22, that is carried by the bracket 300 and said brushes 302 engage with conductor bars 304, Figs. 3, 25 and 26, that are carried in a plate of insulating material 305 that is secured to one of the side bars 263 of the main map frame.

The conductor bars 304 are connected by electrical conductors 306, Figs. 25 and 26, with other brushes 307 that are supported on an insulating plate 308 secured to curved end portions 309 that are supported on an insulating plate 308 secured to curved end portions 309 of the main map frame bars 263.

The brushes 307 make electrical contact with upright conductor bars 310 supported within the housing 197. The conductor bars 310 are electrically connected in a suitable manner with the proper conductor rings 222 in the bottom portion 198 of the housing 197, Fig. 2.

This provides an arrangement of electrical conductor which maintain uninterrupted electric circuits, and at the same time, allow the inner housing member 197 to move rotatively within the outer housing member 193, and allow the map frames to move vertically within the inner housing member 197 and allow the north and south map frame to move transversely of the main map frame.

A substantially square map carrying frame comprising two oppositely disposed side bars 280, see Figs. 3 and 16 through 20 of inversely duplicate construction and two other oppositely disposed side bars 281 and 282, of cross sectional shapes which differ from each other, is movably supported within the north and south map frame 267—267₁—268. This last mentioned frame 280—281—282 supports the map for east and west adjustment of the image on the view plate 206 and is hereinafter termed the east and west map frame.

The side bar 282 of the east and west map frame, see Figs. 16 and 17, fits over the shaft 269 and is slidable thereon. The other side bar 281 of said east and west map frame has a convexly curved outer portion 283 that fits within the semi-circularly shaped side bar 267 shown at the left in Figs. 16 and 17. It is to be noted that the side bars 281 and 267 are shown in spaced apart relation in Figs. 16 and 17, these figures being to that extent exploded views. However, when the parts are assembled the side bar portion 283 will always be positioned within the bar 267 and will be supported and guided thereby.

The means for moving the east and west map frame transversely in the north and south map frame, i. e., to the left or to the right as respects the showing in Fig. 3, comprises a threaded shaft 284 of the form shown in Figs. 3 and 24. The shaft 284 is journaled in the frame members 268 by bearings 285 and passes through a tubular passageway 286 in the frame member 281.

Frame member 281, Figs. 3 and 24, is adapted for controlled east and west movement along shaft 284 by halved nuts 287 mating threads of shaft 284, said nuts being split at 299 and held securely into frame member 281 by crimping at 288. These halved nuts are secured against rotation by dowel pins 290.

The square thread on the shaft 284 shown in Fig. 24 is similar in construction and mode of operation to that used on the map frame elevator posts 223 shown in Fig. 17 and hereinbefore described.

The means for rotating the threaded shaft 284 in either direction to move the east and west map frame to the left or to the right as respects the showing in Figs. 3 and 24 comprises a repeater motor 291, Fig. 3, having a pinion 292 that meshes with a gearwheel 293.

The repeater motor 291 is carried by bracket means 294 that is secured to the north and south map frame and the gearwheel 293 is supported in a bearing member 295 that is secured to the north and south map frame. The gearwheel 293 is provided with a rigidly connected pinion 296 that meshes with a gearwheel 297 on the threaded shaft 284, Fig. 24.

Electrical energy to repeater motor 291 is supplied from upright conductor bars 298, Fig. 3, through brushes, conductors and conductor bars that are duplicates of those shown in Figs. 22, 25 and 26 and hereinbefore described in connection with repeater motor 274.

The east and west map frame formed of side bars 280—281—282 has a swingingly mounted rectangular frame therein for releasably receiving and holding the map plate 219. This frame, Figs. 18, 19 and 20, comprises inwardly directed U-shaped side portions 311 open at their forward ends and adapted to slidably receive and firmly grip the edge portions 312 of the map plate 219. The edge portions 312 are of reduced thickness as shown in Fig. 18.

The back hinge portion 313 of the map plate receiving frame is mounted on a pivot 314 which supports the frame pivotally but is of a relatively close fit to prevent undesirable play or motion. The front portion 315 of the map plate frame extends upwardly and outwardly and is shaped as shown in Figs. 18 and 19.

A catch member 317 formed by transversely displacing a portion of the member 315 is provided in said front portion 315 and is adapted to engage with a shoulder 318 in the bar member 282 to hold the map plate frame in the rigid closed position shown in Fig. 19.

A finger piece 319 extends above the catch member 317 and is positioned in alignment with a groove 320 in the bar member 282 so that it may be readily engaged by the finger to spring the front portion to the left as respects the showing in Fig. 19 and release the catch member 317. A recess 321 in the front portion 315 just below the catch member 317, Fig. 18, provides clearance for the finger to allow the map plate to be grasped and pulled out of the guide members 311 when the map plate frame is unlatched and swung upwardly on hinge member 314.

The map plate 219 is of transparent material, such as glass, and the map thereon is preferably made by a photographic process so that a large map may be reduced to a very small scale on the map plate and yet retain all of its detail and be extremely clear and sharp. Any desired portion of this map may be projected onto the view plate 206 as hereinafter explained.

Preferably the photographic map image is on the lower or bottom side of the map plate 219 so that it may be positioned in very close proximity to the scale of miles and direction plate 218 upon which the scale of miles and direction line 251 are shown.

The map plate 219 is very firmly held within the frame members 311 and the map frame means is firmly held in the position shown in Figs. 18 and 19 by the latch member 317 so that the map plate is always very accurately positioned and very firmly held.

The map may be changed quickly and easily by moving the map frame, preferably to the limit of their upward movement, opening up the top or view plate portion 206—207 of the housing, see Fig. 2, releasing the catch member 317, swingingly moving the map plate frame upwardly on pivot 314, manually grasping and withdrawing one map plate from the frame, inserting another map plate therein and returning the several parts to their correct positions as shown in Figs. 18, 19 and 20.

The maps may be of any desired scale but I find that it is satisfactory to use a map of an entire continent on each map plate 219.

*Air speed device*

In Figs. 27 to 31 inclusive I show an air speed device. Three air speed devices of this type are used in connection with this invention. All of these air speed devices are similar and the following description will apply equally well to any one of them. Two of these air speed devices are adjustable and are controlled from the true north follower, 220—240, Fig. 2, which is controlled by the master compass. One air speed device is fixed and non-adjustable. One of the air speed devices is controlled by the true north follower 220—240, Fig. 2, and is the north and south air speed device 104 shown in Fig. 4 and the other is the east and west air speed device 105, also shown in Fig. 4.

The fixedly mounted air speed device is numbered 125 in Fig. 4. All of these air speed devices are mounted on the air craft in locations where the exposed parts thereof are always subjected to the natural velocity and direction of the air passing the craft but are not subject to artificially created air blasts such as the blasts from a propeller.

Each air speed device comprises a cup shaped housing 325 having a downwardly extending axial shaft 326 journaled in a bearing 327.

The cup shaped housing 325 has an annular cover portion 328 secured thereto. The cover portion 328 has a peripheral gear 329 that meshes with a pinion 330 on a repeater motor 331. The repeater motor 331 is controlled from the master compass 100, Fig. 4, through the true north follower 220—240 shown in Figs. 2, 51 and 52 and hereinbefore described.

The true north follower means is connected with motor 331 through conductors 369, 370, 371 and 372.

Two resilient supporting members 332 extend upwardly from the cover portion 328 on opposite sides of the center thereof and support a cap member 333 that has a thin flat air vane 334 extending upwardly therefrom. The resilient members 332 are preferably in the form of thin flat springs that are adapted to be deflected sidewise by pressure exerted on the air vane 334 and that act as parallel links to move the cap 333 sidewise without tilting the same.

The resilient members 332 are adapted to be deflected in directions at right angles to the plane of the air vane 334 and the direction and amount of their deflection will be determined by the direction and amount of air pressure exerted against the vane 334. Usually the air pressure will be exerted at an angle against the vane 334 and the component of this pressure that is exerted at right angles to the vane 334 will be the component that will determine the direction and amount of deflection of the resilient members 332 at any particular time.

The vane 334 of the north and south air speed device 104 will be maintained by its repeater motor 331 in an east and west plane and the vane 334 of the east and west air speed device will be similarly maintained in a north and south plane.

All portions of this air speed device except the vane 334 are housed within the air craft on which it is mounted to protect all parts except the vane 334 from air or wind pressure. In Figs. 27 and 28 I have shown the vane 334 as projecting out through an opening 335 in a member 336 which may be the shell or housing of an air craft or the shell of an airplane wing.

The cap member 333 is movable in close proximity to the member 336 but is not in actual contact therewith.

A moisture and dirt shield, preferably in the form of a highly pliable tubular member 337 which may be of thin rubber, being held to cap 333 and cover 328 by wire or snap rings 324 extends between the cap member 333 and the annular cover member 328. This shield excludes moisture and dirt from the cup 325 and from the cap member 333 but does not seriously interfere with the sensitivity of operation of the resilient members 332.

The lower side of the cap member 333 is provided with a reflecting surface 338 which is cylindrical in form, having a circular cross section, with its axis at point 93, as shown in Fig. 27 and a straight, transverse, cross section as viewed in Fig. 28. This reflecting surface is adapted to convergently reflect divergent light rays incident thereon emanating from light source 343 and being reflected by mirror 344 and passing through slot 345, in such a manner as to cause same to converge into a narrow blade of light on selenium or other photo-electric grid 348 of a type hereinafter described. When parallel motion to the right or left, as respects the showing in Fig. 27, is imparted to the reflector 338 the blade of light reflected thereby onto said grid 348 will be moved in the same direction, and to the extent of twice the distance on said grid 348.

The cup shaped housing 325 is divided by a diametrical partition 340 into a light compartment 341 and another compartment 342 the upper portion of which 347 carries said light actuated grid 348.

The light compartment 341 has lamps 343 provided therein and preferably has a reflector member 344 in the bottom portion thereof that is adapted to reflect light upwardly through a slot 345 in a partition 346 onto the said reflector 338.

Preferably the reflector member 344 is of glass with the top surface 360 ground so as to diffuse light and the bottom surface 359 thereof mirrored so as to reflect light upwardly through the ground glass surface 360. The bottom portion 358 of the housing 325 around the reflector 344 is preferably dead black. The remainder of the interior of the housing may be light reflecting but is not necessarily so. This lighting arrangement insures that an evenly distributed light will be directed upwardly through the slot 345 at all times.

A fragment of this grid or cell is shown in Fig. 30 and the same is shown diagrammatically in Fig. 31. This grid or cell 348 comprises a plurality of parallel plates 350 supported in spaced apart relation by insulating material 351. The plates 350 are of greater upper extension than the insulating material and the space between the plates 350 that is not occupied by the insulating material has light responsive material 352, such as selenium, provided therein. This light responsive material is adapted to have its conductivity varied when light falls on it. When selenium is thus used its conductivity is increased when light falls on it to the extent that it is capable, when subjected to the action of light, of serving as an electrical conductor between two adjacent plates 350. Each selenium member 352 thus acts as a light responsive switch to electrically connect the two plates in contact therewith when it is subjected to the action of light and to electrically disconnect said two plates when it is not illuminated.

The blade of reflected light from the reflector 338 falls on the light grid 348 in such a manner that the light blade coincides lngitudinally with the strips 352 of selenium. If the reflector 338 is moved by a variation of air pressure on the vane 334 this light blade will be moved substantially twice as great a distance over the face of the grid 348 so as to successively illuminate the selenium strips one at a time. This progressively closes and opens the electrical circuits between successive plates 350.

The grid 348 is positioned at the side of the slot 345 through which light is directed upwardly and the position of the reflecting surface 338, as shown in Fig. 28 directs the light sidewise and downwardly onto the cell or grid 348.

Preferably the pliable shield 337 and the resilient members 332 and all of the lower surfaces of the cap 333 except the reflector 338 are dead black to avoid reflecting any light downwardly onto the grid or cell 348 except that reflected by reflector 338. The shield 337 also serves to exclude all outside light.

The electrical connections to the plates 350 are made in such a manner as to provide a closing sequence in the circuits of a repeater motor the same as that provided by the grid 240, Figs. 2, 51 and 52 and by the cells 151, 152 and 153 of Figs. 5 to 10 hereinbefore described when a blade of light is moved over the grid or cell 348.

To accomplish this I connect every alternate plate 350 with a common conductor 354. The other plates, i. e., the plates between those that are connected with conductor 354, are connected in rotation with three conductors 355, 356 and 357, as shown in Fig. 31.

When the plates 350 are connected with the conductors as above described and a blade of light incident on the grid and extending crosswise thereof is moved to the right as respects the showing in Fig. 31 then the three conductors 355—356 and 357 will be successively energized in the order just mentioned. If the blade of light is moved to the left, as respects the showing in Fig. 31, then these three conductors will be energized in the order 357—356—355.

The conductors 354, 355, 356 and 357 are shown diagrammatically in Fig. 31. Preferably the portions of these conductors that connect with the plates 350 are disposed within chamber 342 of the housing 325 and said conductors extend outwardly through the shaft 326, which is preferably tubular, and are transferred through conductor rings 361 and brushes 362 to the exterior of the shaft 326. The same numerals have been used to designate these conductors on both sides of the rings 361 and brushes 362.

Energy for the lamps 343 preferably enters the housing 325 by way of conductors 365, brushes 364 and rings 363.

Three of these air speed devices are used in my ground follower map and navigation instrument as designated by numerals 104, 105 and 125 in Fig. 4. The north and south air speed device 104 is controlled by the true north follower means 220—240, Fig. 2, which always maintains the air vane 334 thereof in a true east and west plane. The east and west air speed device 105 is also controlled by the same true north follower and the air vane 334 thereof is always maintained in a true north and south plane.

The fixed air speed device 125 is not automatically controlled but is fixedly mounted on the air craft with its air vane 334 at right angles to the fore and aft axis of the craft.

Maintaining the vane 334 of the north and south air speed device 104 always in a true east and west plane makes it possible to always obtain from said vane a reaction which accurately represents the north or south component of the air velocity.

Likewise maintaining the vane 334 of the east and west air speed device always in a true north and south plane makes it possible to always obtain from said vane a reaction which accurately represents the east or west component of the velocity of the craft relative to the air.

The air speed device 125, being fixedly mounted with its vane 334 at right angles to the fore and aft axis of the vehicle will always give a reaction which accurately represents the speed of the vehicle relative to the air in the direction of its propulsion.

The conductors 354, 355, 356 and 357 of the north and south air speed device 104, Fig. 4, are connected with coils 162, 163 and 164 of a follower motor such as is shown Figs. 8, 9 and 10, of a follower motor in the algebraic sum device 108. The corresponding conductors of the east and west air speed device 105 are similarly connected with a follower motor in the algebraic sum device 115. The corresponding conductors of the fixed air speed device 125 are connected with a follower motor in the scale to log device 126. In each instance a source of energy, such as a battery 158, is connected in the circuit provided by conductors 354, 355, 356 and 357.

It will be understood that the battery 158 is merely representative, in each instance, of a source of direct current.

*Direction finder and ground speed indicating device*

Figs. 32 to 35 inclusive disclose a direction finder and ground speed device comprising two relatively movable flat cardinal direction component plates or slides 400 and 401, hereinafter termed direction plates, positioned one upon the other and movable in directions at right angles to each other and respectively guided for movement in guideways 402 and 403 in a frame 404.

Figures 33, 34:
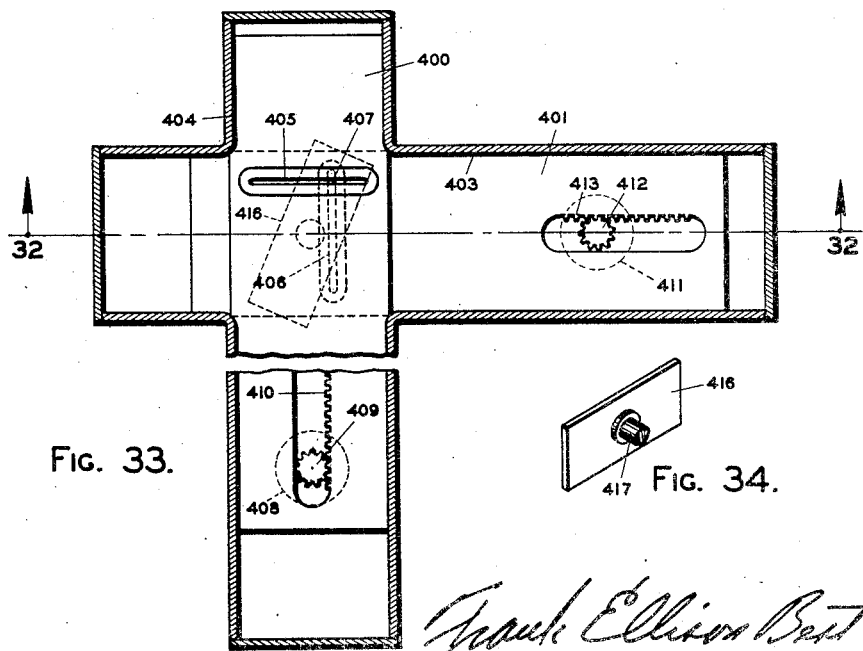
Fig. 33 is a reduced view partly in section and partly in plan taken substantially on broken line 33—33 of Fig. 32.
Fig. 34 is a detached reduced perspective view of a grid cell frame and shaft embodied in the invention.

A slot 405 is provided in the upper direction plate 400 transverse to its direction of movement and a similar slot 406 is provided in the direction plate 401 transverse to its direction of movement. The two slots 405 and 406 cross each other and are positioned at right angles to each other, as shown in Fig. 33, and said two slots provide, at the location where they cross, a light opening 407 which is movable by sliding adjustment of the direction plates. If one only of the direction plates is moved the light opening will be moved in a straight line and in the same direction as the moving plate. If both direction plates are moved then the direction and distances of movement of the light opening will be the resultant of north-south and east-west component movement imparted to it by the two plates.

Movement of the direction plate 400 is controlled by a repeater motor 408 having a pinion 409 that meshes with a gear rack 410 in said plate 400. Movement of the direction plate 401 is similarly controlled by a repeater motor 411 having a pinion 412 that meshes with a rack 413 in said plate 401.

Repeater motors 408 and 411 are respectively controlled from the north and south algebraic sum device 108 and the east and west algebraic sum device 115, Fig. 4, as hereinafter explained.

A light dome 414 of inverted bowl shape is provided over the overlapped portions of the direction plates 400 and 401 and a lamp globe 415 is provided in this dome. Preferably the inside wall of the light dome 414 is made a flat white to help provide an evenly distributed light in all parts of the dome.

Light from the dome 414 passing downwardly through a movable opening 407 falls upon a quadruple grid cell in a frame 416.

The grid cell frame 416 has a centrally positioned shaft 417 that extends at right angles from the back portion thereof and is journaled in bearings 422 in the frame 404. The shaft 417 has two sets of electrical conductor rings 418 and 419 secured thereto, there being four conductor rings in each set. Brushes 420 and 421 contact the respective conductor rings 418 and 419.

The lower end portion of the shaft 417 is rigidly secured by a nut 423 to the top portion 424 of a cylindrical light control shutter 425. The light control shutter 425 has a gear 426 on the peripheral portion thereof that meshes with a pinion 427 on a shaft 428 to which two opposed electric motors 429 and 430 are connected. Obviously two opposed windings in the same motor will accomplish the same purpose as the two opposed motors.

Figure 32:
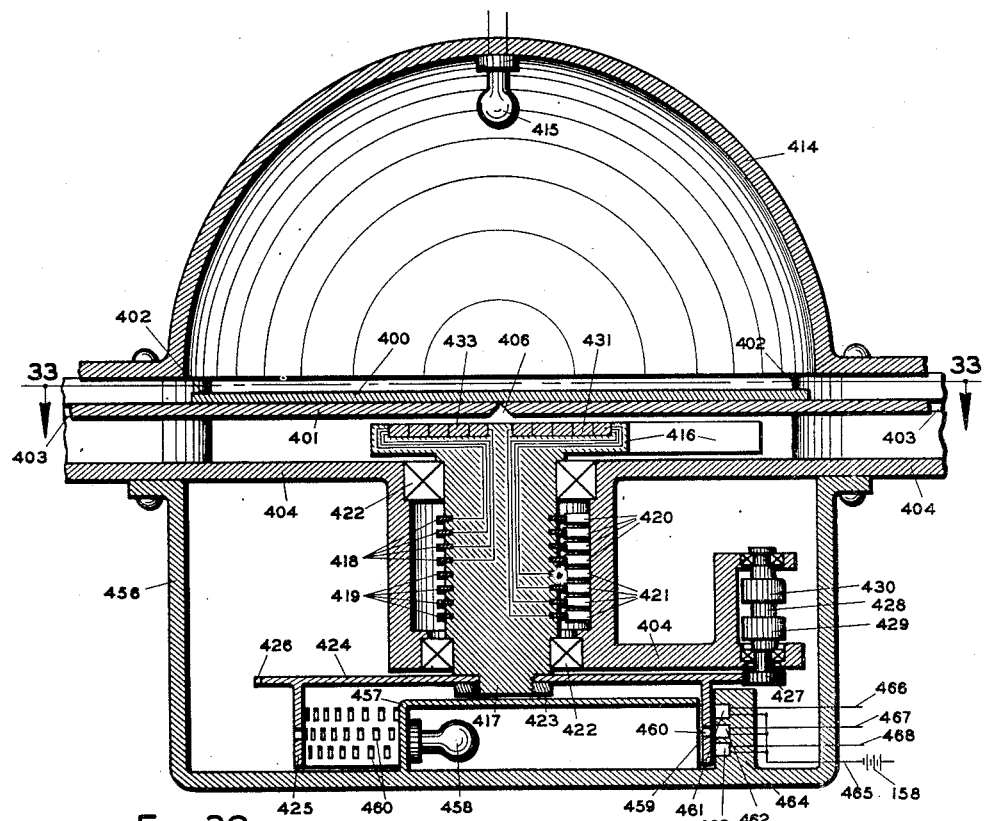
Fig. 32 is a vertical sectional view, taken substantially on broken line 32—32 of Fig. 33 showing a direction finder and ground speed device constructed in accordance with my invention, parts being diagrammatically shown.
Figure 35:
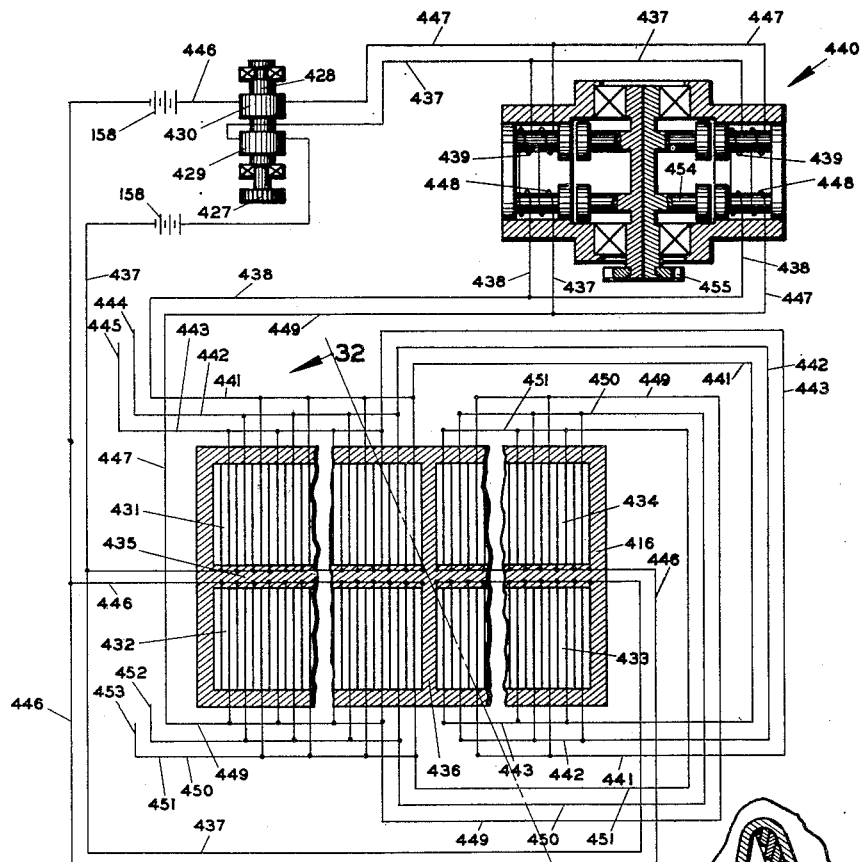
Fig. 35 is a diagrammatic view of a four segment light grid cell embodied in the device shown in Figs. 32, 33 and 34 showing the electrical connections of the same to motors which control the rotative movement of said cell and also to a repeater motor used in a ground speed arithmetical scale-to-logarithm device.

The grid frame 416, Fig. 32, has four independent light actuated grid cells 431, 432, 433 and 434, Fig. 35, therein. These cells are electrically separated from each other along two straight lines 435 and 436 which lines are positioned at right angles to each other and intersect each other on the axis, projected, of the shaft 417. The lines 435 and 436 may be spaced between the cells or they may be insulating material.

The construction of each grid cell 431, 432, 433 and 434 is substantially identical with the construction of the grid cell 348 of Figs. 30 and 31.

Alternate plates of the grid cells 431 and 433, Fig. 35, are connected by conductor means 437 with the motor 429, a source of energy, such as a battery 158, being included in this connection. The return circuit from the motor 429 to the other plates of the grid cells 431 and 433 may be through the coils of a repeater motor 440 shown diagrammatically in Fig. 35 and more fully hereinafter described.

Return connections through conductors 438, one set of coils 439 of motor 440 and conductors 441 are shown in Fig. 35. Conductors 441 are each grouped with two other conductors 442 and 443 and similar return connections are provided through other coils of the motor 440, not shown in Fig. 35 and through conductors 444 and 445 to the conductors 442 and 443. In this connection it will be understood that the motor 440, Fig. 35, has six poles corresponding to the poles of the repeater motor shown in Figs. 8 and 10.

Alternate plates of the grid cells 432 and 434 are connected by conductor means 446 with the motor 430, a source of energy such as a battery 158 being included in this connection. The circuit from the motor 430 to the other plates of the grid cells 432 and 434 is shown to be completed through conductors 447 and one set of coils 448 of the repeater motor 440 and conductors 449. Conductors 449 are each grouped with two other conductors 450 and 451 and similar return connections are provided through other coils of the motor 440, not shown in Fig. 35 and through conductors 452 and 453 to the conductors 450 and 451. It will be understood that the motor 440 has six poles corresponding to the poles of the motor shown in Figs. 8 and 10.

Movement of the direction plates 400 and 401 will vary the position of the spot of light passing through opening 407 and cause it to fall on different parts of the grid cells 431, 432, 433 and 434. If this spot of light falls on grid cells 431 or 433 the motor 429 will be energized and will act through pinion 427 and gear 426, Fig. 32, to rotatively move the grid holder 416, shaft 417 and light shutter 425 in one direction.

If this spot of light falls on grid cells 432 or 434 the motor 430 will be energized and the grid holder 416, shaft 417 and light shutter 425 will be rotatively moved in the opposite direction.

When the spot of light passing through opening 407 falls on the line 435 between two of the cells, i. e., between cells 431 and 432 or cells 432 and 433, then the motors 429 and 430 will be equally energized and will bring the cell holder 416 and shaft 417 and shutter 425 to rest.

The position of the spot of light will thus always be governed by the movement of the direction plates 400 and 401. The movement of these direction plates is governed by the north and south and east and west components of ground speed, as measured by the wind velocity and air speed coming from the air speed devices 104 and 105 and the wind velocity dials 106 and 107, Fig. 4, through the algebraic sum devices 108 and 115 to the respective motors 408 and 411, Fig. 33.

This will always position the spot of light passing through the opening 407 so that it correctly represents the direction in which the air vehicle is traveling and said spot of light will correctly rotatively position the grid cell carrier 416 and light shutter 425 in accordance with the direction of travel.

The distance of the spot of light from the common center of the grid cells 431, 432, 433 and 434 will be representative of the ground speed and will operate the ground speed motor 440. This motor 440 is shown diagrammatically in Fig. 35.

The repeater motor 440, Fig. 35, is similar to the repeater motor shown in Figs. 8 and 9 except that it has two coils wound in the same direction on each core. These coils are illustrated by the two sets of coils 439 and 448 in Fig. 35, and it will be understood that the motor 440 is a six pole motor corresponding to the motor shown in Figs. 8 and 9 and that it has two sets of coils in addition to the coils shown in Fig. 35.

The coils 439 are connected with the two diagonally opposite grids 431 and 433. The coils 448 are connected with the other diagonally opposite grids 432 and 434. Thus if the light spot is incident on the grid 431 the coils 439 will be energized, if it is incident on the grid 432, which is positioned on the dividing line 435 between the grids 431, 432 and partly incident on each of said grids 431 and 432 both sets of coils 439 and 448 will be energized. In all of the above instances either one or both of said coils will be energized to properly operate the motor.

If the light spot is incident on one or both of the grids 433—434 at the other end of the grid cell the coils 439 and 448 will be similarly energized.

If the light spot moves to the left, Fig. 35, over the grids 431 and 432 the conductors 441—442—443 and the conductors 451—450—449 will be energized in the order just mentioned to operate the motor 440 in one direction. If said light spot is moved to the right, Fig. 35, over the same cells these conductors will be energized in the reverse order to operate the motor 440 in a reverse direction. Similarly movement of the light spot in one direction over either or both of the cells 433 and 434 will operate the motor 440 in one direction and movement of said light spot in an opposite direction over these cells will operate the motor in a reverse direction.

The repeater motor 440 is preferably positioned in the housing 600 of a ground-speed scale-to-log device, Fig. 47, and the armature 454 of said repeater motor 440 is provided with a pinion 455 which meshes with a suitable gearwheel 610 of the ground speed scale-to-logarithm device shown in Fig. 47 and more fully hereinafter described.

The parts shown in Fig. 32 which extend below the frame 404 are enclosed within a housing 456 of inverted cup shape that is secured to frame 404.

A light housing 457 having a light globe 458 therein is supported within the bottom portion of the cup shaped housing 456 and adapted to direct a blade of light outwardly through a slot 459 in the end portion thereof. The light housing 457 is positioned within the light shutter 425 and adapted to direct the blade of light outwardly through the light apertures 460 to fall upon light cells 461, 462 and 463.

The light cells 461, 462 and 463 are supported by a bracket 464 and connected by a common conductor 465 with a source of energy, such as a battery 158. Other conductors 466, 467 and 468 connect the cells 461, 462 and 463 and the battery 158 respectively with the follower motor 254, 255, Figs. 12 and 13, that drives the direction plate frame 252.

This provides means for rotatively moving the direction plate 218 in synchronism with the grid cell 431—432—433—434, so that the line 251 on said direction plate will always show the true direction in which the vehicle is traveling.

The light shutter and housing and cells 461, 462 and 463 are the same in construction and mode of operation as those shown in Figs. 5 and 6 and hereinbefore described.

*Operator controlled wind velocity devices*

Two operator controlled wind velocity devices of the type shown in Figs. 36, 37, 38 and 39 are used in this ground follower map and instrument as indicated in Figs. 1 and 4. One of these wind velocity devices, designated generally by numeral 106 in Figs. 1 and 4, is adapted to be adjusted to indicate the north and south component of wind velocity. The other, designated generally by numeral 107 in Figs. 1 and 4, is adapted to be adjusted to indicate the east and west component of wind velocity.

The information as respects wind velocity will be initially obtained from a ground station and will preferably be given in terms of north and south and east and west components. Each wind velocity device has a dial 470, Figs. 1 and 36, preferably graduated in a logarithmic scale so that the graduations marking the lower wind velocities, which are used the most, are farther apart than the graduations marking the higher wind velocities and therefore are more easily readable and are susceptible to more accurate settings for the most used velocities than for the higher velocities.

Figure 36:
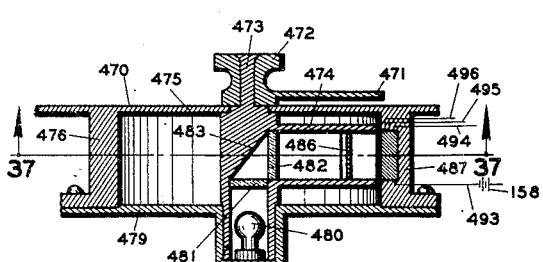
Fig. 36 is a sectional view, on broken line 36—36 of Figs. 1 and 37, showing an operator-controlled logarithmic wind velocity device constructed in accordance with this invention.
Figure 37:
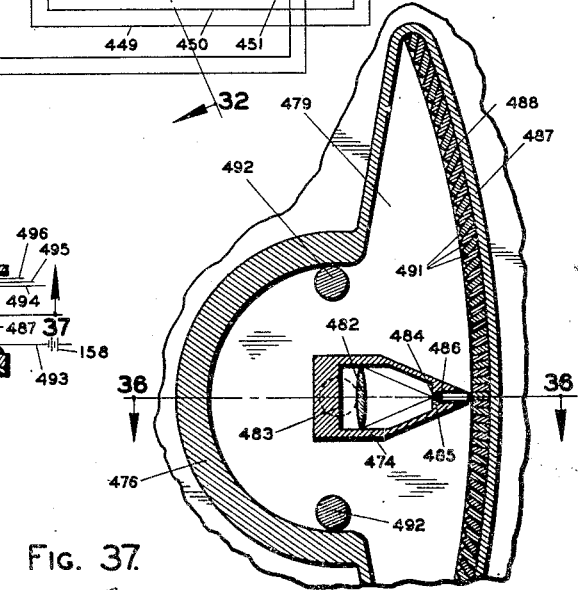
Fig. 37 is a sectional view with parts in plan taken substantially on broken line 37—37 of Fig. 36.

Each wind velocity device, Figs. 1, 36 and 37, has a pointer 471 on a thumb knob 472. The thumb knob 472 is connected with the stem 473 of a light housing 474. The stem 473 is journaled in the top plate 475 of a housing 476. The lower end portion 477 of the light housing 474 is cylindrical and tubular and is journaled in a boss 478 that is formed in a housing bottom 479.

A lamp globe 480 is supported by the housing bottom and positioned in the tubular portion 477 of the light housing. The light housing 474 has two lenses 481 and 482 provided therein at right angles to each other and has a light reflector 483 positioned at an angle of forty-five degrees to both of these lenses and disposed between said lenses whereby light from the lamp 480 will first pass through the first lens 481 and then fall upon the reflector 483 by which it will be reflected outwardly through the lens 482.

The lenses 481 and 482 are of a double convex cylindrical type of lens which will converge the rays of light passing therethrough into a blade of light that will pass through an upright slot 484 in a partition 485, Fig. 37, and thence pass through a converging lens 486 of substantial length. The converging lens 486 is adapted to converge the rays of light into a parallel beam that will pass outwardly through the outer end of the light housing 474 and fall upon the cells of a light responsive logarithmic grid.

The housing 476 is shaped somewhat like a fan, as respects the cross section shown in Fig. 37. The light housing 474 is rotatively movable on an axis common to the stem 473 and the tubular member 477.

The front wall 487 of the housing 476 is curved as shown. A curved light grid is supported by the wall 487. This light grid comprises a plurality of electrically conductive spaced apart plates 488 positioned in planes, which if projected, would pass through the center about which the light housing 474 rotatively moves.

The plates 488 are supported in spaced apart relation by electrical insulation 489, Fig. 39, and have light responsive material 490 such as selenium provided therebetween. The face portions 491 of the light responsive material are positioned at substantially right angles to the plates 488, which makes them substantially at right angles to the blade of light from the light housing 474.

Preferably the face portions 491 of the light responsive material are coated with any suitable transparent material such as shellac, varnish, cellulose acetate or the like to protect the light responsive material without interfering with the light rays.

The light grid cells directly opposite the outer end of the light housing 474, when said light housing is in the position shown in Fig. 37, are closest to the light housing 474 and the light grid cells to either side thereof recede in distance from the light housing, as shown.

The parallel light blade directed outwardly from the housing 474 is rotatively moved about the axis of rotation of said housing. The faces 491 of the light cells are all of subtantially the same width and are all at substantially right angles to the light blade but are at different distances from the center of rotation of the light blade.

As the pointer 471 is moved angularly over the logarithmic scale 470, Fig. 1, the light blade will be moved through a corresponding angle over the light grid cells and the number of light grid cells affected thereby will be proportional to the angular movement of the pointer 471 over the logarithmic scale 470. Thus the grid of light responsive cells will correctly interpret the logarithmic scale 470 and provide electrical impulses proportional to said scale 470.

Preferably I provide one light cell for each division, whether shown or not, on the logarithmic scale 470. The number of light cells 490—491 would thus be determined by the number of divisions or theoretical divisions on the scale 470.

Two stop members 492 are provided in the housing 476 to limit rotary movement of the light housing 474 in both directions.

Preferably the light blade that is projected by the housing 474 is wide enough to completely cover one light cell but is not wide enough to completely cover two light cells at a time.

Alternate plates 488 of the light grid, see Fig. 38, are connected with a common conductor 493 and the remaining plates of the light grid are connected in rotation with three conductors 494, 495 and 496. A source of enery such as a battery 158 is included in the circuit. If a blade of light moves to the left over the light grid, as respects the showing in Fig. 38, the three conductors will be repeatedly energized in the order 494—495—496 and will operate a repeater motor in one direction. If the blade of light moves to the right, Fig. 38, these conductors will be repeatedly energized in the order 496—495—494 and will operate a repeater motor in an opposite direction.

The conductors 493, 494, 495 and 496 from two of the manually controlled wind velocity devices of the form shown in Figs. 36, 37, 38 and 39 are connected with the respective follower motors of the algebraic sum devices 108 and 115 as shown in Fig. 4.

One of these algebraic sum devices will be described now.

*Algebraic sum device*

A device for finding the algebraic sum of two variable values is shown in Figs. 40 and 41.

This device comprises a cup shaped housing 500 having a cover plate 501 secured thereto. A bearing 502 in the cover plate 501 rotatably supports a light shutter 503 of inverted cup shape.

The light shutter 503 has a plurality of light apertures 504 provided in the cylindrical wall thereof. I have shown three annular rows of light apertures 504 and have shown said light apertures 504 to be offset relative to each other transversely of the shutter ring. The relative position of these apertures may be varied as long as an arrangement of said apertures is maintained so that light may pass through said apertures in proper sequence.

An L-shaped light housing 506 has a tubular portion 507 mounted in a bearing 508 in the bottom portion of the housing 500.

Three light responsive cells 509, 510 and 511 are supported by an extension 512 of the light housing 506 in a position externally of the light shutter 503 and in respective alignment with the annular rows of apertures 504.

A lamp 516 is supported by the bottom of the housing 500 and positioned within the tubular portion 507 of the light housing. The light from this lamp 516 passes through a lens 513 thence falls on a reflector 515 and is reflected outwardly through another lens 514. The lenses 513 and 514 are positioned at right angles to each other in the two branches of the L-shaped light housing 506. The reflector 515 is positioned between these lenses and at an angle of forty-five degrees to both of them.

The lenses 513 and 514 converge the light to a narrow blade which passes outwardly through the front end portion of the light housing 506 and falls on the inner wall of the cylindrical light screen 503. If one of the apertures 504 is aligned with this blade of light the light passes through the aperture and actuates the light responsive cell that is aligned with said aperture.

The cylindrical light shutter 503 is externally provided with a gear-wheel 517 that meshes with the pinion 518 of a repeater motor 519. The repeater motor 519 is connected with the conductors 354, 355, 356 and 357 that lead off from one of the air speed devices 104 or 105, Figs. 4 and 31.

The light housing 506 has a gearwheel 520 secured thereto and meshed with a pinion 521 of a repeater motor 522. The repeater motor 522 is connected with the conductors 493, 494, 495 and 496 that lead off from one of the operator controlled wind velocity devices 106 or 107 of Figs. 4, 36 and 38.

The repeater motors 519 and 522 are both similar in construction to the repeater motor shown in Figs. 8 and 9.

It will be understood that the connections between the repeater motors 519 and 522 and the air speed device and manually controlled wind velocity device are interchangeable and that the algebraic sum device will operate in the same way if the conductors 354, 355, 356 and 357 are connected with motor 522 and the conductors 493, 494, 495 and 496 are connected with motor 519.

A source of energy such as a battery 158 is provided in the circuit with each repeater motor 519 and 522.

The light responsive cells 509, 510 and 511 are electrically connected through brushes 523 and conductor rings 524 with a conductor 525 which is common to all three of said cells and with three other conductors 526, 527 and 528 which are connected with the individual cells 509, 510 and 511 respectively. A source of energy, such as a battery 158 is connected with conductor 525.

The algebraic sum device, Fig. 40, will be operated by electrical impulses coming into the repeater motors 519 and 522 from an air speed device and an operator controlled wind velocity device and the rotary movements imparted thereby to the light shutter member 503 and light housing 506 will provide electrical impulses through the light responsive cells 509, 510 and 511 which truly represent the algebraic sum of the impulses received in the repeater motors 519 and 522.

*Scale to motion devices*

The algebraic sums provided by the devices 108 and 115 of Fig. 4, which devices are of duplicate construction and are shown in detail in Figs. 40 and 41, are in scale value form, i. e., they are represented by a dial movement proportional to the values represented.

To impart a progressive movement to the map frames so that the map will have a true and accurate ground following movement when the vehicle on which the apparatus is installed is moving, it is necessary to provide means for interpreting this scale value in the form of velocity of motion.

Figs. 42, 43 and 44 show such a device for producing motion that is proportional to and governed by the scale value from the algebraic sum devices.

The devices shown in Figs. 42 and 43 comprise a fixed housing plate 535 provided with a downwardly extending cylindrical member 536 that has a substantially semicircular pocket 537 for the reception of a light responsive grid cell 538.

A tubular L-shaped light housing 539, is mounted in a bearing 540 in a fixed frame member 541. A lamp 542 is supported from the frame means 543 and positioned within the lower portion of the tubular light housing 539.

The light from the lamp 542 passes upwardly through a lens 544 and falls on a reflector 545 by which it is reflected outwardly through another lens 546. The two lenses are positioned at substantially right angles to each other and the reflector 545 is positioned substantially at an angle of forty five degrees to the lenses.

The lenses 544 and 546 converge the light rays into substantially a blade of light, Fig. 43, which is focused so as to fall on the grid cell 538 when it is not intercepted.

A substantially semi-cylindrical light shutter 547 having a flat top end portion 548 is provided within the cylindrical member 536. The arc covered by this semi-cylindrical light shutter 547 is just equal to the arc covered by the grid cell 538 so that the shutter 547 will completely cover the grid cell 538 when positioned in exact registration therewith.

If the light shutter 547 is moved in either direction from a position of exact registration with the grid cell 538 then it will leave a portion of the grid cell uncovered and exposed to the blade of light from the light housing 539.

The end portion 548 of the shutter is secured to a bearing shank 549 that is journaled in the frame plate 535 and is positioned axially of the device. A gearwheel 550 is secured to the upper end portion of the bearing shank 549. A pinion 551 of a repeater motor 552 meshes with the gearwheel 550.

The conductors 525, 526, 527 and 528 from one of the algebraic sum devices 108 or 115, Fig. 4, see also Fig. 40, are connected with the repeater motor 552 so that said repeater motor is controlled by either the north and south or the east and west algebraic sum device depending on whether it is installed in the north and south or east and west train of mechanism.

The light housing 539 is provided with a gearwheel 553 that meshes with a pinion 554 of a uniform speed motor 555. The motor 555 operates continuously and at a uniform speed and drives the light housing 539 continuously in the same direction and at a uniform speed when the ground follower map is in use. The blade of light from the light housing is thus rotated continuously and at each revolution will operate all light cells 538 not covered by the light shutter member 547.

The number of light cells not covered and the position in the grid 538 of these uncovered cells is determined by the repeater motor 552 which is controlled by one of the algebraic sum devices, the number of uncovered cells being measured by and proportional to the sum given off by the algebraic sum device in terms of electrical impulses.

Each time the blade of light passes over these uncovered cells it will provide impulses proportional to the number of uncovered cells and these impulses will be repeated upon each revolution of the blade of light thus providing a train of impulses proportional to the scale value given off by the algebraic sum device and suitable for controlling movement of the map frames shown in Figs. 2, 3 and 16 to 26 inclusive.

The grid cell 538 is of the same construction as the grid cell shown in Figs. 27 to 31 in that it has a plurality of spaced apart parallel electrically conductive plates 556 having the light responsive sections 557 therebetween.

Every alternate plate 556 is connected with a common conductor 558. The other plates 556 are connected in rotation with three other conductors 559, 560 and 561. The order of rotation in which the plates 556 are connected with the conductors 559, 560 and 561 is reversed at a center point 562, Fig. 44, so that when the blade of light moves in one direction over cells 557 positioned at one side of the center point 562 it will complete the circuits through conductors 559, 560 and 561 in one order and when it moves in the same direction over cells positioned at the other side of the center point 562 it will complete the circuits through these conductors in the reverse order.

The blade of light will always be moving in the same direction and the shutter 547 can never be moved far enough to uncover both groups of cells 557 at both sides of the point 562, since the arcuate extension of shutter 547 equals the arcuate extension of both groups of grid cells 538 as has been explained. Thus if cells 557 at one side of point 562 are uncovered impulses in proper sequence to operate a repeater motor in one direction will be provided, while if cells 557 at the other side of the point 562 are uncovered impulses in proper sequence to operate the same repeater motor in the opposite direction will be provided.

The conductors 558, 559, 560 and 561 from the grid 538 go to another algebraic sum device which is a duplicate of the algebraic sum device shown in Figs. 40, and 41 and hereinbefore described. One of these algebraic sum devices 111 is shown in the north and south series of instruments, Fig. 4, and a similar algebraic sum device 118 is shown in the east and west series of instruments in Fig. 4.

The algebraic sum devices 111 and 118 also are adapted to receive electrical impulses from manual map movers 110 and 117 respectively. The manual map movers 110 and 117 are of duplicate construction and one of the same will now be described.

*Manual map movers*

The manual map mover shown in Figs. 45 and 46 comprises a cylindrical housing 565 having an annular light grid 566 provided therein. The grid 566 is similar to the light grids shown in Figs. 30, 31, 51 and 52 hereinbefore explained. It comprises a plurality of spaced apart electrically conductive plates 567, Fig. 46, having light responsive material 568 therebetween.

Alternate plates 567 are connected with a common conductor 569 and the remaining plates 567 are connected in rotation with three conductors 570, 571 and 572 as shown in Fig. 46.

The housing 565 has a bottom plate 573 that is provided with an upwardly protruding tubular bearing support 574. A bearing 575 in the support 574 supports a rotatable L shaped tubular light housing 576.

A lamp 577 is supported by the bottom plate 573 and positioned within the light housing 576.

Light from the lamp 577 is adapted to pass through one lens 578 and be reflected by a reflector 580 through another lens 579 that is positioned at right angles to the lens 578. The lenses 578 and 579 converge the light rays into a blade of light which is directed outwardly through the housing 576 and falls on the cells 568 of grid 566. Provision is made for breaking the circuit to the lamp 577 when the device is not in use.

The light housing 576 is adapted to be rotated by a gearwheel 581 that is rigid with said housing 576 and meshes with a pinion 582 of a reversible electric motor 583.

The electric motor 583 is preferably controlled by two push button switches 112—113 or 119—120, Figs. 1, 4, 11 and 45, depending on whether it is in the north and south or east and west series of instruments. These push button switches 112—113 and 119—120 are shown on the instrument board in Fig. 1 and are shown diagrammatically in Fig. 4. Preferably the push buttons 112 and 113 are marked "N" and "S" and the push buttons 119 and 120 are marked "E" and "W" to designate north and south and east and west respectively.

Also preferably these push buttons

112—113—119—120 are all of the spring actuated type and will only maintain their circuits closed as long as they are held down.

The wiring connections to these push buttons, such as the push buttons 112—113, Fig. 45, comprise two conductors 584 and 585 connected with the motor 583 and the lamp 577 and with a source of energy such as a battery 158. A plurality of conductors 586 connect the push button 112 with the conductors 584 and 585. A plurality of other conductors 587 connect the other push button 113 with the conductors 584 and 585.

If the push buttom 112 connected with conductors 586 is depressed, a circuit to the motor 583 and lamp 577 will be closed in one direction from the source 158. If the push button 113 connected with conductors 587 is depressed, a circuit to the motor 583 and lamp 577 will be closed in the reverse direction from the source 158. In one instance the motor 583 will be operated in one direction and in the other instance the motor 583 will be operated in a reverse direction. Thus a manual control for operating the motor in either direction is provided.

The conductors 569, 570, 571, 572 from the grid 566 are connected with the algebraic sum device 111 in the north and south series of instruments and with the algebraic sum device 118 in the east and west series of instruments.

Four electrical conductors 590, 591, 592 and 593 connect the algebraic sum device 111, Fig. 4, in the north and south instrument series, with the north and south map moving repeater motor 274 shown in Fig. 3, the motor 274 being a part of the automatic map mover 114 shown in Fig. 4. In like manner four electrical conductors 594, 595, 596 and 597 connect the algebraic sum device 118, Fig. 4, in the east and west instrument series, with the east and west map moving repeater motor 291 shown in Fig. 3, the motor 291 being part of the automatic map mover 121 shown in Fig. 4.

*Ground speed scale to log device*

Figure 47:
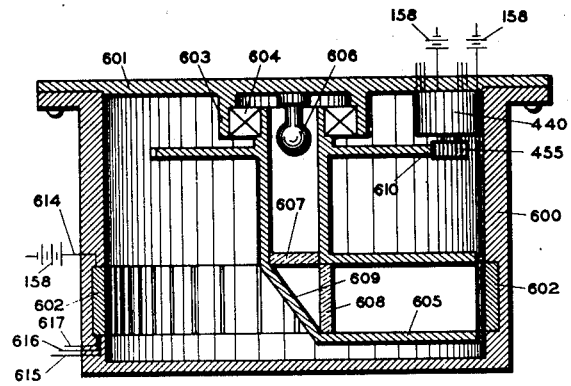
Fig. 47 is an axial sectional view of a ground speed scale-to-log device embodied in this invention, parts that are connected therewith being diagrammatically shown.
Figure 48:
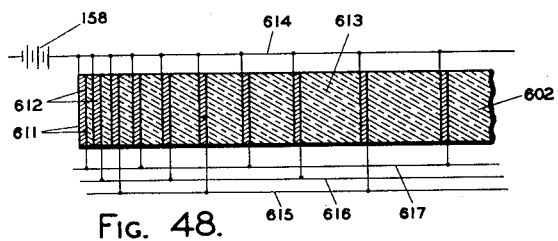
Fig. 48 is a diagrammatic developed view of a fragment of a logarithmic light grid cell used in the device shown in Fig. 47.
Figure 49:
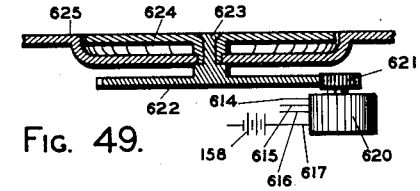
Fig. 49 is a fragmentary sectional view showing parts of a ground speed device that is operated by the values provided by the scale-to-log device shown in Figs. 1, 47 and 48.

Figs. 47, 48 and 49 show a device for converting the ground speed scale values taken from the ground speed repeater motor 440, shown in Fig. 35, into logarithmic values suitable for operating a dial 624, Figs. 1 and 49, that is movable relative to a logarithmic scale of miles 625 on the ground speed indicator on the instrument board. Preferably a pointer 626 in the form of an arrow is marked on the dial 624.

The device shown in Figs. 47, 48 and 49 is shown diagrammatically at 99 in Fig. 4.

Figs. 47 and 48 show a housing 600 having a cover plate 601 thereon.

The housing 600 has a logarithmic grid 602 therein. The cover plate 601 has a downwardly extending centrally positioned bearing support 603 that supports the bearing 604 of an L-shaped tubular light housing 605.

A lamp 606 is supported by the cover plate 601 and positioned within the tubular light housing. Light from the lamp 606 passes through a lens 607 and is reflected by a reflector 609 through another lens 608. The lenses 607 and 608 converge the light rays into a blade of light which passes out of the end of the light housing and is incident on the logarithmic grid 602.

A gearwheel 610 on the lamp housing 605 meshes with the pinion 455 of the repeater motor 440.

The logarithmic grid 602, see Fig. 48, differs from the light responsive grids hereinbefore described in that it is made up of a plurality of individual cells each comprising two spaced apart plates 611 of electrically conductive material having light responsive material 612 therebetween.

The individual cells are spaced apart unequal distances and are insulated from each other, the insulation being represented by 613 in Fig. 48. The distances of spacing of the light responsive cells 611—612 are such as to convert arithmetical scale readings into the logarithmical scale readings of the dial.

These distances between the cells 611—612 are shown as varying progressively between a position where they are relatively close together and a position where they are spaced much further apart. The light beam from the housing 605 will be moved a predetermined distance by each impulse transmitted to the repeater motor 440. The spacing of the cells in the logarithmic grid 602 over which the light beam travels will determine the number of impulses sent out over the conductors 614, 615, 616 and 617 that are connected with said grid, for a predetermined movement of the light housing 605. The arithmetical movements of the motor 440 are thus interpreted logarithmically by the grid 602.

The conductors from the grid 602, Fig. 48, go to a repeater motor 620, Fig. 49. The repeater motor 620 is connected by a pinion 621 and gearwheel 622 with the shaft 623 to which a dial 624 that move relative to the logarithmic ground speed scale 625 is secured, see Fig. 49. The repeater motor 620 is similar to the repeater motor shown in Figs. 8 and 9 except that it is friction bound just enough to prevent movement of the rotor thereof when the light blade is totally out of registration with any of the cells 612, as said light blade will be when it is incident on the wider blocks 613 of insulation, and all of the coils are de-energized. In this motor the rotor thereof will always be aligned with any two diametrically opposite coils that are energized and will retain its position after the coils with which it is aligned are de-energized and until two other coils are energized.

This motor thus operates to correctly move the dial 624 relative to the logarithmic scale 625 so that the pointer 626 on the dial always points to the correct reading on the scale 625.

The devices shown in Fig. 49 are indicated diagrammatically in Fig. 4.

Preferably a logarithmic time scale, readable in hours and minutes is marked on the dial 624, as shown in Fig. 1. This time scale provides a direct reading in miles of the distance you will travel in any number of hours and minutes within its range, at the speed the vehicle is traveling. Thus if the ground speed indicator shows that a ship is traveling 300 miles per hour, the miles per hour dial read with respect to the fifteen minute mark will show that the ship will travel 75 miles in fifteen minutes.

Fixed air speed device

The fixed air speed device 125, Fig. 4, is a duplicate of the air speed device shown in Figs. 27 to 31 inclusive except that the said fixed air speed device is rigidly mounted on the ship with the vane 334 thereof in a plane at right angles to the fore and aft axis of the ship. Thus this vane will always be subject to the air component which is moving fore and aft of the ship.

This air speed device will be affected by the actual difference in speed between the air and the ship in the ship's heading. The values or scale in the form of electrical impulses provided by the air speed device 125 are transmitted by conductors 632, 633, 634 and 635, Fig. 4, to the follower motor of the scale-to-log device 126.

This scale-to-log device is similar to the scale-to-log device shown in Figs. 47, 48 and 49 and hereinbefore described. It provides a logarithmic interpretation of the scale values furnished by the fixed air speed device 125. This logarithmic interpretation in the form of electrical impulses is transmitted by conductors 636, 637, 638 and 639 to the log-to-dial device 127, Figs. 4 and 50.

Figure 50:
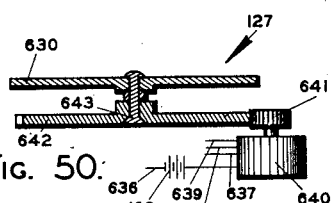
Fig. 50 is a fragmentary sectional view taken on lines 50—50, Fig. 1, showing parts of an airspeed device that is operated by values provided by a scale-to-log device like that shown in Figs. 47 and 48 which is connected with a fixed airspeed device.

The log-to-dial device 127, Fig. 50, comprises a repeater motor 640, having a pinion 641 meshed with a gearwheel 642 on the shaft 643 of the air speed dial 630. The motor 640, like the motor 620, is friction bound to the extent that it will not move when none of its coils are energized.

The repeater motor 640, actuated by logarithmic values from the scale to log device 126, operates the dial 630 so as to provide proper readings on the logarithmic scale 631 with reference to a pointer 629 that is marked on the dial 630. These readings give the true velocity of the ship relative to the air in the ship's heading.

Operation

The operation of this device was outlined in the "General Description" at the beginning of this specification and a description of the operation of the several units has been given in connection with the foregoing structural description of these units. The following description summarizes the operation of the device.

The instrument board provides at all times a true showing of all directions by accurately showing both the magnetic north and the true north. This showing of directions is accomplished by the use of the master compass and true north correction devices shown in Figs. 5 to 11.

The main view plate provides a showing of a section of the map of any desired size and, after the map has been adjusted so that the position of the air vehicle on the map coincides with the center of the circle 97, which is projected onto the view plate, the map will always keep pace with the vehicle and the center of the circle 97 will always represent the location of the vehicle. Also the main view plate shows, by the direction and scale of miles line 251, the direction in which the vehicle is traveling and the true scale of miles on the map regardless of the scale on which the map is shown on the view plate.

The air speed dial 630 shows the correct speed of the vehicle through the air in the direction in which it is moving.

The north and south and east and west wind component velocity devices 106 and 107 always show the north or south and east or west components of wind velocity as first set up from information given from a ground station and subsequently corrected from time to time by the operator as the map is found to drift.

The ground speed indicator 624—625—626 gives the actual ground speed and gives a direct reading of the time it will take the vehicle to travel a certain distance at the speed it is making at the instant the dial is observed.

The instrument board thus furnishes to the pilot of an air vehicle all of the information that he needs relative to the cardinal directions, the location of the air vehicle relative to the earth, the actual ground speed of the air vehicle, the air speed of the air vehicle and the direction and velocity of the wind.

In operating this device the pilot will obtain, usually by radio telephone from a ground station, the direction and velocity of the wind at the elevation at which he wishes to fly. This information will be given to him in components, thus if he receives the information that the wind is "north sixty, west fifty" he will set the north and south pointer 471 at sixty points north and the east and west pointer 471 at fifty points west.

These settings of the pointers 471 will register through the mechanism shown in Figs. 36, 37, 38 and 39 and the values given over conductors 493, 494, 495 and 496 will be transmitted to the algebraic sum device 108 or 115, depending on whether it is a north and south or an east and west registration.

At the same time values in terms of electrical impulses provided by the air speed devices 104 and 105 will be transmitted to the algebraic sum devices and said algebraic sum devices will give out values, in terms of electrical impulses, which represent the algebraic sum of the values that actuate them.

These values or sums provided by the algebraic sum devices 108 and 115 will be conducted to the repeater motors 408 and 411, Fig. 33, which control the movements of the north and south and east and west direction finder and ground speed device slides 400 and 401 respectively; these units being indicated diagrammatically by 94 and 95 in Fig. 4.

The algebraic sums which thus control the two slides 400 and 401 will accurately represent the sum of the air speed components and the wind velocity components in the cardinal directions and will actuate the slides 400 and 401 accordingly so that the position of the spot of light which passes through the opening 407, Fig. 33, and falls on the quadruple grid in holder 416 will accurately represent the direction and ground speed of the vehicle. The direction will be registered on the direction plate 218, Fig. 12, by the action of shutter 425, Fig. 32, cells 461, 462 and 463, conductors 465, 466, 467 and 468 and motor 254—255, Fig. 12.

The values from the quadruple grid are also changed from scale to logarithmic values in the scale-to-log device 99, Fig. 4, shown in detail in Figs. 47 and 48 and are used in the log-to-dial device 98, Fig. 4, shown in detail in Fig. 49, to operate the dial 624 and register on the logarithmic scale 625 the actual ground speed of the vehicle.

At the same time these algebraic sums from devices 108 and 115 are converted from scale values to motion values in the scale-to-motion devices 109 and 116 and the motion values are transmitted by conductors 558, 559 and 560 and 561 to the algebraic sum devices 111 and 118.

These algebraic sum devices 111 and 118 are also connected by conductors 569, 570, 571, 572 with manual map movers 110 and 117 respectively. If the manual map movers are not being operated then the algebraic sum devices 111 and 118 will respond to the values from the scale to motion devices 109 and 116 by merely duplicating the values communicated to them by the scale-to-motion devices. If both the scale-to-motion devices 109 and 116 and the manual map-movers 110 and 117 are operating then the algebraic-sum-devices will provide values which are the true algebraic sum of the values transmitted to them.

The values from the algebraic-sum-devices 111 and 118 are transmitted by conductors 590, 591, 592, 593 and 594, 595, 596, 597 to the respective automatic map movers shown diagrammatically by 114 and 121 in Fig. 4.

If the scale-to-motion devices 109 and 116 alone are operating, the map movers will move the map in proportion to the movement of the air vehicle in the air and the position of the air vehicle will always coincide with the center of the map.

If, through observation, the pilot finds that the position of his air vehicle does not coincide with the center of the map, he can move the map either to east, west, north or south or in any two of these directions by depressing one or more of the push button switches 112 or 113 and/or 119 or 120. The manual map-movers operate at substantial speed and will operate either when the scale to motion devices are operative or when they are inoperative.

The automatic map movers are operated by the motors 274 and 291, Fig. 3. The motor 274 controls the north and south map movement by moving the rectangular map frame 267—268. The motor 291 controls the east and west map movement by moving the square map frame 280, 281 and 282, Fig. 3.

Movement of the map frames and the scale of miles and direction frame up and down to thereby adjust the scale of the map section that is projected onto the view plate is controlled manually by push button switches 236 and 237, Figs. 1, 14 and 15. These switches control the motor 228 which drives the internal gear ring 226 and the internal gear ring 226 operates the threaded upright shafts 223.

The threads on the upright shafts 223 which carry the scale of miles and direction plate frame 243 are of slightly less pitch than the threads on the upright shafts 223 which carry the main map frame 262—263. This provides for moving the map plate and the direction plate apart as they move upwardly and moving said two plates closer together as they move downwardly. In this way the scale of miles will be varied in the correct ratio to the scale of the map.

The circle 97, Fig. 12, which is marked on the direction plate 218 in the center thereof and on the scale of miles and direction line will always be projected onto the view plate 206 and will be enlarged and reduced in the same ratio as the scale of miles and the map. This circle may represent a given area such as twenty miles in diameter on the map and when the map is correctly adjusted the position of the air vehicle will always coincide with the center of this circle.

The fixed air speed device 125, Fig. 4, operates through the scale-to-log device 126 and through the log-to-dial device 127, see also Fig. 50, to provide a correct reading of the speed that the air vehicle is making through the air in the direction it is traveling.

It will be understood that numerous changes in this device may be made within the scope and spirit of the following claims.

Having thus described my invention, what I claim as new and desire to secure by Letters Patent of the United States of America, is:

1. In a ground following map and navigation instrument, a master magnetic compass, a repeater motor, light governed means controlled by said master magnetic compass and controlling said repeater motor, a magnetic north ring adapted to be rotatively moved by said repeater motor, a housing adjustably supported within said magnetic north ring, means for adjusting said housing relative to said ring to correct for magnetic declination, a view plate, a map carried by said housing, and a projector positioned to project an image of said map on said view plate.

2. In a ground following map and navigation instrument, a master magnetic compass, a repeater motor, light governed means controlled by said master magnetic compass and controlling said repeater motor, a magnetic north ring adapted to be rotatively moved by said repeater motor, a housing adjustably supported within said magnetic north ring, a scale in degrees carried by said housing in cooperative relation to said magnetic north ring, adjustable means connecting said housing and said magnetic north ring providing for a true north correction therebetween, a view plate, a map carried by said housing, and a projector positioned to project an image of said map onto said view plate.

3. In a ground following map instrument for a vehicle, the combination of elements comprising a view plate, a map plate adapted to have a map thereon, a distance scale plate adapted to have a scale thereon indicating distance from a fixed point on said view plate, said map plate being adjustable to bring various portions of the said map in register with said fixed point on said view plate, all adapted to show scaled distances from the portion of said map in register with said fixed point, projector means adapted to throw images of said map and said distance scale on said view plate and motive means adapted to move said map plate and said distance scale plate toward and away from said view plate with the same proportional movement adapted to change the scale of said map and said distance scale proportionately.

4. In a ground following map and navigation instrument, a housing, a view plate in the upper portion of said housing, a main map frame in said housing, screw means supporting said main map frame for movement toward and away from said view plate, a north and south map frame supported for movement in one direction in said main map frame, an east and west map frame supported in said north and south map frame for movement in a direction at right angles to the direction of movement of said north and south map frame, a map supported in said east and west map frame, a distance scale plate, screw means supporting said distance scale plate in proper scale relation with said map, and light projector means positioned to project an image of said map onto said view plate.

5. In a ground following map instrument for a vehicle, the combination of elements comprising a frame plate, a compass card carried thereby, a view plate, also carried by said frame plate, ground following map means and projector means cooperative therewith in the projection of a ground-following map image, cardinally congruent with corresponding surface configurations of the earth, onto said view plate, true and apparent direction indicating means adapted to indicate the true and apparent direction of travel respectively from a fixed point on said map image approximately corresponding to the vertically projected position of the instrument relative to said configurations, said compass card adapted to the indication of cardinal directions on said image from said fixed point, and compass means adapted to the cardinal orientation of said compass card.

6. In a ground following map instrument for a vehicle the combination of elements comprising a view plate, ground following map means and projector means cooperating therewith to project a ground-following map image, cardinally congruent with the configurations of the earth's surface, onto said view plate and a rotatable direction-indicating means adapted to indicate the line of travel on said map image from a fixed center of rotation on said view plate, a compass card disposed round about said fixed center of rotation and compass means and declination-correcting means adapted to cardinally orient said compass card about said fixed center of rotation.

7. In a ground following map and navigation instrument for a vehicle, the combination of elements comprising a view plate; projector means; means cooperating with said projector means in the production on said view plate of a composite image of a map of the surface configurations of the earth round about and beneath said vehicle and of a plurality of distance graduation images, said distance graduation images imparting distance perception to the observer of relative distances of said configurations from the position of said vehicle; compass means; a compass card disposed round about said image; follower motor means and declination correcting means cooperating to cardinally orient both said image and said compass card.

8. In a ground following map and navigation instrument for a vehicle, the combination of elements comprising a view plate, projection means, means cooperating with said projection means to produce on said view plate an image of a map of the relatively moving surface configurations of the earth round about and beneath said vehicle, a rotatable direction-indicating means showing the line of travel of said vehicle on said image, a compass card disposed around said image, and master compass and follower motor means cooperating to cardinally orient said compass card and said image.

9. In a ground following map and navigation instrument for a vehicle, the combination of a compass card having declination correcting means; a view plate disposed within said compass card; projection means; map means and scale and pointer means cooperable with said projection means in the production on said view plate of a composite image of a map of the relatively moving surface configurations of the earth round about and beneath said vehicle, of a line-of-travel pointer and of an arcuate distance scale; said distance scale image indicating scale distances on said map image from a fixed point on said view plate, said fixed point representing at each moment the location of said vehicle on said surface configurations, said projection means including mounting means for said map means and for said scale and pointer means movable to adjust the magnification of the composite image.

FRANK ELLISON BEST.

REFERENCES CITED

The following references are of record in the file of this patent:

UNITED STATES PATENTS

| Number | Name | Date |
|---|---|---|
| 352,374 | Tilden | Nov. 9, 1886 |
| 1,450,061 | Coblentz | Mar. 27, 1923 |

(Other references on following page)

UNITED STATES PATENTS

| Number | Name | Date |
|---|---|---|
| 1,475,583 | Hoxie | Nov. 27, 1923 |
| 1,579,880 | Meissner et al. | Apr. 6, 1926 |
| 1,585,210 | Roux | May 18, 1926 |
| 1,635,795 | Linnebach | July 12, 1927 |
| 1,644,454 | Tiedman | Oct. 4, 1927 |
| 1,701,582 | Mengden | Feb. 12, 1929 |
| 1,880,105 | Reifel | Sept. 27, 1932 |
| 1,894,684 | Hawk | Jan. 17, 1933 |
| 1,985,266 | Smith et al. | Dec. 25, 1934 |
| 2,007,986 | Sprague | July 16, 1935 |
| 2,109,283 | Boykow | Feb. 22, 1938 |
| 2,114,652 | Dalton | Apr. 19, 1938 |
| 2,132,676 | Chance | Oct. 11, 1938 |
| 2,163,746 | Courtois-Suffit et al. | June 27, 1939 |
| 2,174,047 | Stainbrook | Sept. 26, 1939 |
| 2,186,330 | Fitzgerald | Jan. 9, 1940 |
| 2,255,771 | Golay | Sept. 16, 1941 |
| 2,267,649 | Graves | Dec. 23, 1941 |
| 2,314,497 | Gargrave et al. | Mar. 23, 1943 |
| 2,341,042 | Hill | Feb. 8, 1944 |
| 2,361,973 | Smith | Nov. 7, 1944 |
| 2,423,513 | Meyer | July 8, 1947 |

FOREIGN PATENTS

| Number | Country | Date |
|---|---|---|
| 174,622 | Great Britain | June 25, 1923 |
| 358,196 | Great Britain | Oct. 8, 1931 |
| 796,129 | France | Jan. 17, 1936 |
| 804,208 | France | July 27, 1936 |